US010644609B2

(12) United States Patent
Zhang et al.

(10) Patent No.: US 10,644,609 B2
(45) Date of Patent: May 5, 2020

(54) NESTABLE SINGLE CELL STRUCTURE FOR USE IN A POWER CONVERSION SYSTEM

(71) Applicant: GE Energy Power Conversion Technology Ltd, Warwickshire (GB)

(72) Inventors: Fan Zhang, ShangHai (CN); Richard S. Zhang, ShangHai (CN); Kunlun Chen, ShangHa (CN); Stefan Schroeder, Munich (DE); Zhihui Yuan, Ismaning (DE); Jie Shen, Unterföhring (DE)

(73) Assignee: GE Energy Power Conversion Technology, Ltd., Warwickshire (GB)

( * ) Notice: Subject to any disclaimer, the term of this patent is extended or adjusted under 35 U.S.C. 154(b) by 0 days.

(21) Appl. No.: 14/547,274

(22) Filed: Nov. 19, 2014

(65) Prior Publication Data

US 2015/0214828 A1    Jul. 30, 2015

(30) Foreign Application Priority Data

Jan. 24, 2014    (CN) .......................... 2014 1 0035785

(51) Int. Cl.
*H02M 7/48*    (2007.01)
*H02M 7/487*    (2007.01)
*H02M 1/08*    (2006.01)
*H02M 1/00*    (2006.01)
*H02M 1/32*    (2007.01)

(52) U.S. Cl.
CPC ............. *H02M 7/487* (2013.01); *H02M 1/08* (2013.01); *H02M 2001/0003* (2013.01); *H02M 2001/325* (2013.01)

(58) Field of Classification Search
CPC ........ H02M 1/08; H02M 5/4585; H02M 7/49; H02M 2001/0009; H02M 2001/0003
See application file for complete search history.

(56) References Cited

U.S. PATENT DOCUMENTS 4,736,595 A * 4/1988 Kato .................... F24F 11/0009
62/160
5,705,859 A    1/1998 Karg et al.
5,821,707 A * 10/1998 Kim ......................... H02P 6/06
318/400.01

(Continued)

FOREIGN PATENT DOCUMENTS

CN            1477778 A      2/2004
CN         101262180 A      9/2008

(Continued)

OTHER PUBLICATIONS

European Search Report and Opinion issued in connection with corresponding EP Application No. 15152266.1 dated Oct. 21, 2015.

(Continued)

*Primary Examiner* — Yusef A Ahmed
(74) *Attorney, Agent, or Firm* — Wood IP LLC

(57) ABSTRACT

Provided is an apparatus, including a capacitor module having a plurality of connecting terminals and a plurality of switch elements. Each switch element has at least one switch terminal coupled to a corresponding connecting terminal, wherein the switch elements are configured for mutually exclusive operation via a control device.

17 Claims, 19 Drawing Sheets

(56) References Cited

U.S. PATENT DOCUMENTS

| | | | | |
|---|---|---|---|---|
| 6,278,626 | B1* | 8/2001 | Teichmann | H02M 7/4826 363/135 |
| 6,459,596 | B1* | 10/2002 | Corzine | H02M 5/4585 363/127 |
| 6,697,271 | B2* | 2/2004 | Corzine | H02M 7/487 363/41 |
| 6,697,274 | B2* | 2/2004 | Bernet | H02M 7/487 363/132 |
| 7,126,833 | B2* | 10/2006 | Peng | H02M 7/4826 363/131 |
| 7,508,640 | B2* | 3/2009 | Knapp | H02H 7/1225 361/18 |
| 7,599,196 | B2* | 10/2009 | Alexander | H02M 3/1582 363/124 |
| 7,612,603 | B1* | 11/2009 | Petricek | H02M 3/07 307/109 |
| 7,969,755 | B2 | 6/2011 | Davies et al. | |
| 8,848,405 | B2* | 9/2014 | Temesi | H02M 7/483 363/131 |
| 8,867,295 | B2* | 10/2014 | Mera | G11C 5/147 365/149 |
| 8,981,712 | B2 | 3/2015 | Leu et al. | |
| 9,071,165 | B2* | 6/2015 | Soua | H02M 7/487 |
| 9,106,074 | B2* | 8/2015 | Takizawa | H02H 7/1203 |
| 9,148,069 | B2* | 9/2015 | Gupta | H02M 7/483 |
| 9,214,878 | B2* | 12/2015 | Takizawa | H02M 7/487 |
| 9,252,670 | B2* | 2/2016 | Schroeder | H02M 3/33507 |
| 9,479,080 | B2* | 10/2016 | Yatsu | H02M 7/483 |
| 2004/0178754 | A1* | 9/2004 | Anwar | H02P 3/025 318/362 |
| 2005/0111246 | A1* | 5/2005 | Lai | H02M 5/225 363/157 |
| 2005/0127853 | A1* | 6/2005 | Su | H02M 7/487 318/108 |
| 2007/0153555 | A1* | 7/2007 | Stulz | H02M 7/49 363/20 |
| 2007/0223258 | A1* | 9/2007 | Lai | H02M 5/293 363/37 |
| 2007/0230226 | A1* | 10/2007 | Lai | H02M 5/4585 363/65 |
| 2007/0296383 | A1* | 12/2007 | Xu | H02M 1/14 323/282 |
| 2008/0055947 | A1* | 3/2008 | Wen | H02M 5/458 363/65 |
| 2008/0067872 | A1* | 3/2008 | Moth | H02J 9/062 307/23 |
| 2008/0112200 | A1* | 5/2008 | Tan | H02M 7/487 363/101 |
| 2008/0291708 | A1* | 11/2008 | Teichmann | H02M 1/32 363/50 |
| 2008/0304296 | A1* | 12/2008 | NadimpalliRaju | H02J 4/00 363/45 |
| 2009/0080225 | A1* | 3/2009 | Dijkhuizen | H02M 7/537 363/65 |
| 2010/0084922 | A1* | 4/2010 | Gollentz | H02M 7/487 307/78 |
| 2010/0141041 | A1* | 6/2010 | Bose | H02M 7/487 307/82 |
| 2011/0025236 | A1* | 2/2011 | Takizawa | H02M 1/32 318/139 |
| 2011/0110136 | A1* | 5/2011 | Lacarnoy | H02M 7/483 363/127 |
| 2011/0140727 | A1* | 6/2011 | Soldi | H03K 17/18 324/762.01 |
| 2011/0141786 | A1* | 6/2011 | Shen | H02M 7/487 363/131 |
| 2011/0170322 | A1* | 7/2011 | Sato | H02J 9/062 363/40 |
| 2011/0193412 | A1* | 8/2011 | Lacarnoy | H02M 7/483 307/75 |
| 2012/0068756 | A1* | 3/2012 | Aiello | H02M 7/49 327/333 |
| 2012/0119256 | A1* | 5/2012 | Okita | H01L 25/072 257/140 |
| 2012/0120698 | A1* | 5/2012 | Viitanen | H02M 7/487 363/126 |
| 2012/0206948 | A1* | 8/2012 | Maldini | H02M 7/487 363/97 |
| 2013/0003431 | A1* | 1/2013 | Reddy | H02M 3/285 363/126 |
| 2013/0026831 | A1* | 1/2013 | Sihler | H02J 3/32 307/19 |
| 2013/0044526 | A1* | 2/2013 | Soua | H02M 7/487 363/131 |
| 2013/0088901 | A1* | 4/2013 | Bleus | H02M 7/487 363/71 |
| 2013/0114317 | A1* | 5/2013 | Schlapbach | H02M 1/088 363/131 |
| 2013/0121041 | A1* | 5/2013 | Schroeder | B60L 15/007 363/37 |
| 2013/0223651 | A1* | 8/2013 | Hoyerby | H03F 3/2173 381/120 |
| 2013/0235625 | A1* | 9/2013 | Yamada | H02M 5/4585 363/37 |
| 2013/0272045 | A1* | 10/2013 | Soeiro | H02M 7/537 363/131 |
| 2013/0279211 | A1* | 10/2013 | Green | H02M 7/49 363/35 |
| 2013/0313906 | A1* | 11/2013 | Gupta | H02M 1/00 307/39 |
| 2013/0314957 | A1* | 11/2013 | Gupta | H02M 7/483 363/71 |
| 2013/0343103 | A1* | 12/2013 | Takizawa | H02H 7/1203 363/53 |
| 2014/0009099 | A1* | 1/2014 | Greetham | H02P 1/00 318/558 |
| 2014/0009980 | A1* | 1/2014 | Divan | H02M 5/4585 363/37 |
| 2014/0146586 | A1* | 5/2014 | Das | H02M 1/36 363/49 |
| 2014/0211520 | A1* | 7/2014 | Zhang | H02M 1/126 363/37 |
| 2014/0293667 | A1* | 10/2014 | Schroeder | H02M 7/483 363/60 |
| 2014/0362626 | A1 | 12/2014 | Kidera | |
| 2015/0023080 | A1* | 1/2015 | Chambon | H02M 1/0845 363/131 |
| 2015/0303819 | A1* | 10/2015 | Qu | H02M 7/487 363/35 |

FOREIGN PATENT DOCUMENTS

| | | |
|---|---|---|
| CN | 201570979 U | 9/2010 |
| CN | 102460932 | 5/2012 |
| CN | 203151382 U | 8/2013 |
| CN | 103368427 | 10/2013 |
| CN | 104601000 A | 5/2015 |
| JP | 2004222421 A | 8/2004 |
| JP | 2006271042 A | 10/2006 |
| JP | 2012182974 A | 9/2012 |
| RU | 2496206 C2 | 2/2013 |
| RU | 2517300 C2 | 6/2013 |
| WO | 2007028349 A1 | 3/2007 |
| WO | 2011060823 A1 | 5/2011 |
| WO | 2013099053 A1 | 7/2013 |

OTHER PUBLICATIONS

First Office Action and Search issued in connection with corresponding CN Application No. 201410035785.6 dated Nov. 17, 2016.

Unofficial translation of CN Office Action dated Jul. 3, 2017 in connection to corresponding CN Application 201410035785.6.

Unofficial English translation of Office Action issued in connection with corresponding RU Application No. 2015101199 dated Jun. 13, 2018.

(56) References Cited

OTHER PUBLICATIONS

Unofficial English translation of Office Action issued in connection with corresponding JP Application No. 2015-008197 dated Nov. 7, 2018.

* cited by examiner

501

| Output voltage Level | Switching States | | | | | | | |
|---|---|---|---|---|---|---|---|---|
| | T1 238 | T2 246 | T3 244 | T4 242 | S1 228 | S2 236 | S3 234 | S4 232 |
| 2 | 1 | 0 | 0 | 0 | 1 | 0 | 0 | 0 |
| 1 | 0 | 1 | 1 | 0 | 1 | 0 | 0 | 0 |
| 1 | 1 | 0 | 0 | 0 | 0 | 1 | 1 | 0 |
| 0 | 0 | 1 | 1 | 0 | 0 | 1 | 1 | 0 |
| -1 | 0 | 1 | 1 | 0 | 0 | 0 | 0 | 1 |
| -1 | 0 | 0 | 0 | 1 | 0 | 1 | 1 | 0 |
| -2 | 0 | 0 | 0 | 1 | 0 | 0 | 0 | 1 |

NESTABLE SINGLE CELL STRUCTURE FOR USE IN A POWER CONVERSION SYSTEM

I. FIELD OF THE INVENTION

The present invention relates generally to multi-level topologies for power conversion devices. In particular, the present invention relates to more effective multi-level topologies in high power applications.

II. BACKGROUND

In power electronics, power quality, power density, and efficiency are among the most significant considerations when optimizing the conversion of power from one form to another. For example, power quality is a significant factor when interfacing with the electric grid and electric machines. Maintaining high power quality can be important to avoid issues, such as electromagnetic interference (EMI) pollution, flicker, and shortened life of electric machines due to high current harmonics and dv/dt stresses. Power converters play an important role in this process.

There are generally two methods to achieve high power quality and density in power electronics: increasing switching frequency and multi-level topology. Increasing the switching frequency has limitation, especially for high power and/or medium voltage converters, due to higher losses of power semiconductors associated with higher switching frequency and intrinsic limit of switching speed for high voltage and high power semiconductor devices. Thus, for high voltage and high power applications, multi-level topology is a more effective approach than increasing switching frequency.

Multi-level converter topologies more easily achieve high power quality, high density at higher efficiency. Interfacing with AC electric source and/or load, such as utility grid and electric machines, multi-level converters emulate alternating current (AC) output waveforms by providing multiple voltage levels at the output of the converter. Consequently, switching frequency can be reduced due to lowered output harmonics as result of the multi-level output. Several conventional multi-level topologies and control solutions are widely used in the industry.

One conventional multi-level topology is a three-level neutral point clamped (NPC) topology, which has been the industry's workhorse for over a decade, especially for output voltage below 3.3 kV. However, expanding NPC technology beyond three-levels, in order to achieve higher power quality or for higher voltage applications, represents a significantly increased complexity, thus impractical for wide industry use.

In order to achieve higher than three multi-level output, one has to find ways to couple multiple converters. There are fundamentally two ways for coupling multiple converters—(a) coupling through magnetic components, or (b) coupling through (flying) capacitors.

There are two approaches (i.e., topologies) for coupling multiple converters through magnetic components to realize multi-level converters. A first approach includes multiple converters, generally connected in parallel (or shunt), and coupled with interphase reactors or transformers. This first approach is controlled with interleaved pulse width modulation (PWM) and produces multiple output voltage levels. Drawbacks of this approach include circulating current among the parallel coupled converters, ultimately leading to higher losses, lower semiconductor utilization, and increased control complexity.

A second approach includes multiple single-phase H-bridges (either two-level or three-level H-bridges) connected in series (or cascaded), where each of those single-phase H-bridges are connected to isolated DC links. Due to galvanic isolation provided by a multi-winding transformer, the H-bridges can be coupled together directly with cascaded connection to produce multi-level output voltages correspondingly. Multi-winding transformers, however, are complex and bulky. Also, this approach is difficult and costly to be tailored for four-quadrant operation.

Generally, to process same amount of power, capacitors and power semiconductors tend to have higher density and lower cost than that of magnetic components. Therefore, in comparison to coupling multiple converters with magnetic components, coupling multiple converters with (flying) capacitors provides better power density and efficiency at a lower cost.

Modular multi-level converters (MMC) are yet an additional and widely used capacitor based topology. A number of modular H-bridges are cascaded directly to provide multiple output voltage levels, each one having its own floating DC link capacitors. The voltage levels of these DC links are tightly regulated, using the load current among multi-phases of the cascaded bridge legs. The size of the DC-link capacitors is inversely proportional to the fundamental frequency of the corresponding AC terminal. This solution, therefore, is not optimal for low and variable frequency applications, such as motor drives, due to fairly large floating DC link capacitors.

A better approach than the conventional approaches described above includes coupling multiple converters together through flying capacitors to provide multiple output voltage levels. Voltages across the flying capacitors are regulated every switching cycle. As such, the capacitor size is inversely proportional to switching frequency, instead of the fundamental frequency of the AC source or load. Since the switching frequency is typically more than 30-50 times higher than fundamental frequency, floating or flying capacitor size can be effectively reduced. A further increase of power density, and a reduction in cost, can be thus achieved.

III. SUMMARY OF THE EMBODIMENTS

Given the aforementioned deficiencies, improved methods and systems are needed for providing power conversion multi-level outputs. More particularly, a need exists for improved capacitor based methods and systems to convert power from one form to another.

Under certain circumstances, a power conversion module includes a capacitor module having a plurality of connecting terminals and a plurality of switch elements. Each switch element has at least one switch terminal coupled to a corresponding connecting terminal, wherein the switch elements are configured for mutually exclusive operation via a control device.

Embodiments of the present invention provide efficient multi-level voltage outputs with at least one nested neutral point piloted (NPP) cell. Additionally, systems constructed in accordance with the embodiments include at least one relatively simple three-level NPP structure, along with a unique control system. These NPP structures are scalable to higher voltage applications requiring outputs of more than three levels by simply duplicating the structure in a nested manner.

Flying capacitors, within the nested NPP structures, are actively controlled and balanced within one or more switching cycles to maintain their voltage levels. In this manner, the size of the capacitors is inversely proportional to switching frequency, not the fundamental frequency of the AC terminal. Using this approach, increased power quality and power density can be achieved. The embodiments include other advantages, such as fault redundancy with series devices, flying capacitor balancing, and more robust/faster short circuit and device overvoltage detection. Some embodiments use redundant switching states to achieve additional control features, such as regulation of the flying capacitor voltages and/or balance of thermal stress of power semiconductor switches in different switch positions.

Other embodiments include three-level NPP cells, along with highly precise cell control. For example, a cell can include three switch elements formed of a combination unidirectional and bi-directional switching devices, DC link capacitors in these cells are provided, along with six or more connection terminals to facilitate nested arrangements having an inner cell and outer cell.

Each switch element can be formed of multiple power semiconductor devices connected in series. The series connection can extend the voltage rating of each switch element and enhance reliability by reducing the voltage stress of each power semiconductor device. Fault tolerant operation is provided by simply bypassing faulty semiconductor devices. A byproduct of the disclosed control techniques is faster detection of faults, such as de-saturation and overvoltage of power semiconductor switches.

In another embodiment, the nested structure of the NPP modules can be implemented in a hybrid arrangement, where at least one of the outer cells is a nested NPP cell, while the inner cell may have different topology and/or output levels, such as a 3-level NPC cell or a 2-level cell. A hybrid arrangement may also include the inner and outer cells with different types and/or sizes of power switches. In another embodiment, the nested structure of the NPP cell can be implemented in a multi-phase power conversion system. A multi-phase (e.g. three-phase) converter with nested NPP cells, for example, can share one DC link to provide three-phase DC-AC, AC-DC, or DC-DC conversion. Further features and advantages, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

IV. BRIEF DESCRIPTION OF THE DRAWINGS

The present invention is illustrated in the accompanying drawings, throughout which, like reference numerals may indicate corresponding or similar parts in the various figures. The drawings are only for purposes of illustrating preferred embodiments and are not to be construed as limiting the invention. Given the following enabling description of the drawings, the novel aspects of the present invention should become evident to a person of ordinary skill in the art.

FIG. 5B is a tabular illustration of exemplary switching states for controlling of the nested cell structures shown in FIG. 4.

V. DETAILED DESCRIPTION OF VARIOUS EMBODIMENTS

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Unless defined otherwise, technical and scientific terms used herein have the same meaning as is commonly understood by one of ordinary skill in the art to which this invention belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and to mean, any, several, or all of the listed items.

The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

In the various embodiments, multi-level power conversion is achieved in a manner that provides higher power quality and density than conventional approaches at lower costs. In one embodiment, a multilevel (e.g., three levels) NPP nested cell topology is provided to achieve the multiple output voltage levels. Control signals, output from a controller, selectively activate/deactivate internal converter components to control the voltage output levels—increasing the levels to five, seven, nine, eleven, or more.

The nested cell topology is created by replicating individual cell structures, wrapping one cell around the other, forming an inner cell nested within an outer cell. In these nested cell structures, switches devices, DC link capacitors, and other internal components, can be configured to operate in a cascading manner to produce the required multiple output levels.

The controller can be configured to control operation of the switch elements—activating (turning on) and deactivating (turning off) power switches within the switch elements, one at a time. Each time a power switch is activated, an output voltage level is expressed on one of the cells. Activating and deactivating the power switches enables precise control of the voltage levels output from the converter.

Cell Structure Overview

Figure 1A:
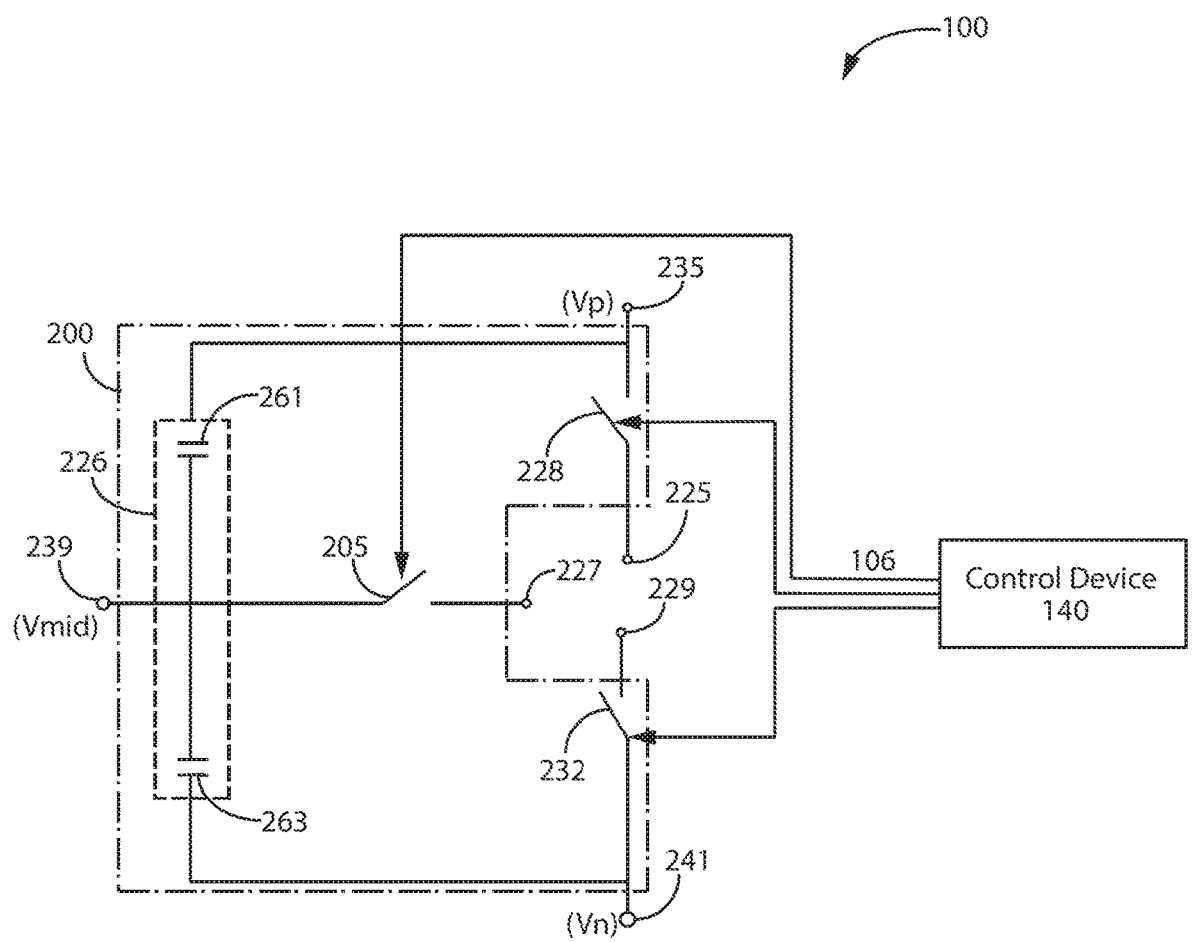
FIG. 1A is a block diagram illustration of an exemplary NPP cell included within a single converter of an exemplary power conversion system, constructed in accordance with embodiments of the present invention.

FIG. 1A is a block diagram illustration of an exemplary basic 3-level cell 200 (e.g., NPP) configured for operation within one of the converters in an exemplary power conversion system. For purposes of illustration, the embodiments, and the figures representative thereof, will be explained within the context of NPP cells. Thus, FIG. 1A provides basic operational principles of NPP cells, in accordance with the embodiments.

In the example of FIG. 1A, the 3-level NPP cell 200 includes switch elements 205, 228, and 232, which are controllable via a control device 140. The control device 140 controls operation of the NPP cell 200 via control signals 106. As understood by those of skill in the art, the control device 140 can be coupled to the NPP cell 200 through wireless, optical, or other similar communication links.

Flying capacitors 261 and 263 form a capacitor module (e.g., DC link 226). In the embodiments, the NPP cell 200 is nestable, or connectable, in a cascading arrangement with other cells with 2 or 3 connecting terminals, such as identical NPP cells. As would be appreciated by one of skill in the art, embodiments of the present invention are not limited to three switch elements nor to two flying capacitors.

The switch element 228 includes connecting terminals 225 (having an interior orientation with respect to the cell 200) and 235 (e.g., exterior orientation with respect to the cell 200 and the direction of the element 228) at respective ends. Similarly, the switch element 232 includes connecting terminals 229 (e.g., interior) and 241 (e.g., exterior) at respective ends.

The switch element 205 includes connecting terminals 227 (interior) and 239 (exterior) at respective ends. The connecting terminal 239 is formed via the connection of the flying capacitors 261 and 263. One such connection is along the path formed by the serial connection of the flying capacitors 261 and 263. The other terminal of the flying capacitor 261 is coupled to the connecting terminals 235. Similarly, the other terminal of the flying capacitor 263 is coupled to the connecting terminal 241. The terms "interior" and "exterior" used herein are for purposes of illustration only and do not limit the scope of the various embodiments.

Control of the cell NPP 200, is achieved through manipulation of the switch elements 205, 228, and 232 in response to the control signals 106. The switching states of the switch elements 205, 228, and 232 occur mutually exclusively. That is, when one switch element within a cell is activated (ON), the other switch elements within that cell are deactivated (OFF), with substantially zero overlap between the various switching states. This mutually exclusive switching facilitates the efficient production of output voltages different levels.

For example, when the switch element 228 is ON, the switch elements 205, and 232 are OFF, and the first output-cascading terminal 225 producers a first level output voltage of Vp. When the switch element 232 is ON, the switch elements 205 and 228 are OFF, and the output-cascading terminal 229 produces a second level output voltage Vn.

Similarly, when the switch element 205 is ON, the switch elements 228 and 232 are OFF, and the output-cascading terminal 227 provides a third level output voltage of Vmid, wherein the output levels are different from one another. More specifically, each of the different level output voltages (Vp, Vu, and Vmid) is exclusively associated with a respective ON switch element. This control process is explained in much greater detail below. In this manner, the NPP cell 200 represents a 3-level NPP cell topology.

Figure 2A:
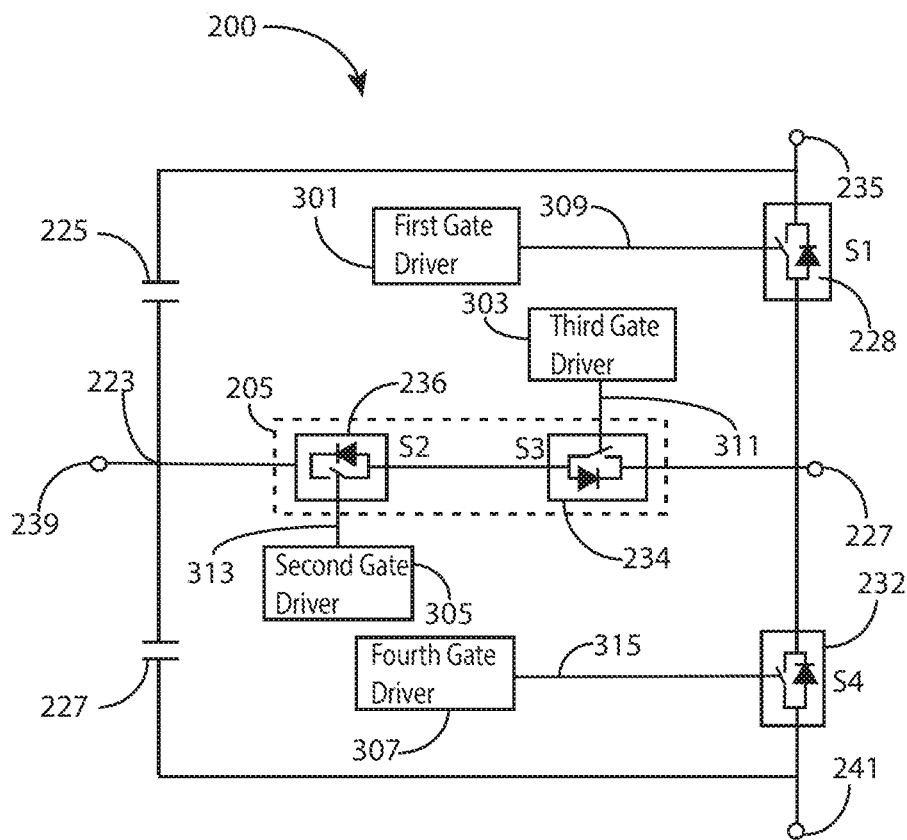
FIG. 2A is an exemplary block diagram illustration of the inner NPP cell constructed in accordance with the embodiments.

By way of example only, and not limitation, each of the switch elements 205, 228, and 232 can each be implemented as a power switch, each being controllable to permit bidirectional current flow. Switch elements 228 and 232 can block unidirectional voltage, while switch element 205 can block bidirectional voltage. Alternatively, as illustrated in the example of FIG. 2A below, one or more of the switch elements 228, and 232 can be implemented as two or more unidirectional power switches connected in series. Switch element 205 can be implemented with two or more unidirectional power switches connected in series in reverse polarity. As can be appreciated by those of skill in the art, multiple low-voltage devices connected in series generally provide a higher total voltage withstanding capability suitable for the application needs.

In the embodiments, the number of power switches within each switch element is an economic factor considered in the production cost and capacity of an individual converter. As such, the present invention is not limited to switch elements that include only one or two power switches.

Figure 1B:
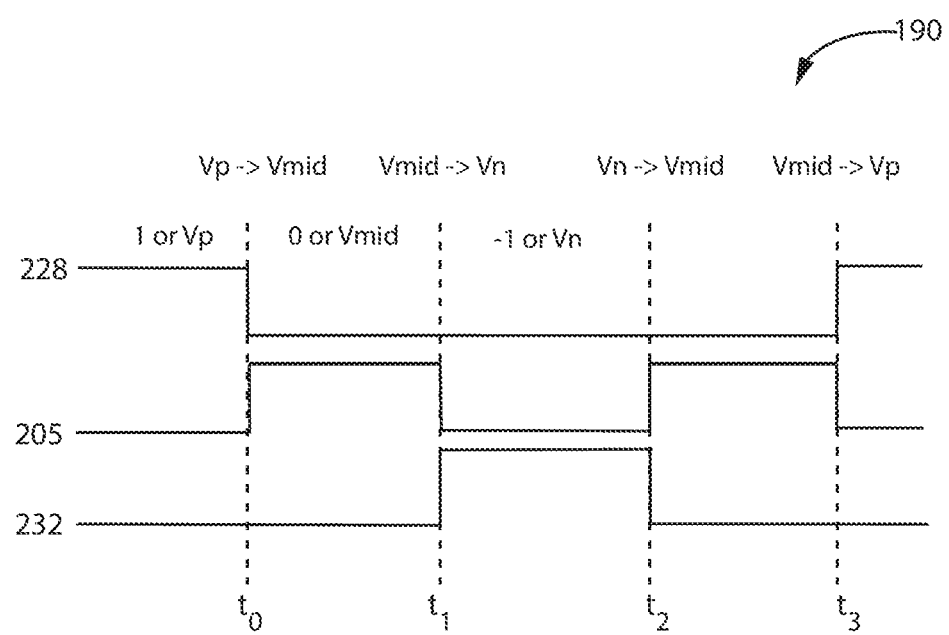
FIG. 1B is a graphical illustration of an exemplary timing diagram for signals generated to control to the inner cell depicted in FIG. 1A, in accordance with the embodiments.

FIG. 1B is a graphical illustration of an exemplary timing diagram 190 of timing signals generated to control the inner cell 200, depicted in FIG. 4 below. In FIG. 1B, for example, at a time instance $t_0$ power switch 205 is activated (ON state), going from "0" to "1" and power switch 228 is deactivated (OFF state), goes from "1" to "0," At time instance $t_1$, the power switch 205 is deactivated, going from "1" to "0," and a power switch 232 is activated, going from "0" to "1." Activation and deactivation are controlled via drive signals (discussed in greater detail below) that can be generated by a single control device, such as the control device 140. Embodiments of the present invention can also produce a floating state in which all power switches are off, or disconnected from all other connecting terminals.

FIG. 2A is a detailed block diagram illustration of an implementation of the inner cell 200 depicted in FIG. 1A. FIG. 2A also depicts gate drivers associated with the switch elements 228, 232, and 205. The multiple power switches in the inner cell 200 are also controlled to perform switching operations in a mutually exclusive manner. As shown in FIG. 2A, the switch element 228 is configured to be switched on/off according to drive signals 309 provided from a gate driver 301. The switch element 232 is configured to be switched on/off according to drive signals 315 provided from a gate driver 307.

The power switch 234 (also referred to as sub-switch) is configured to be switched on/off according to switching drive signals 311 provided from a third gate driver 303. The power switch 236 (also referred to as second sub-switch) is configured to be switched on/off according to switching drive signals 313 provided from a gate driver 305. In some embodiments, as illustrated in FIG. 2B, the drive signals 311 and 313 supplied to the power switches 234 and 236 operate synchronously.

Figure 2B:
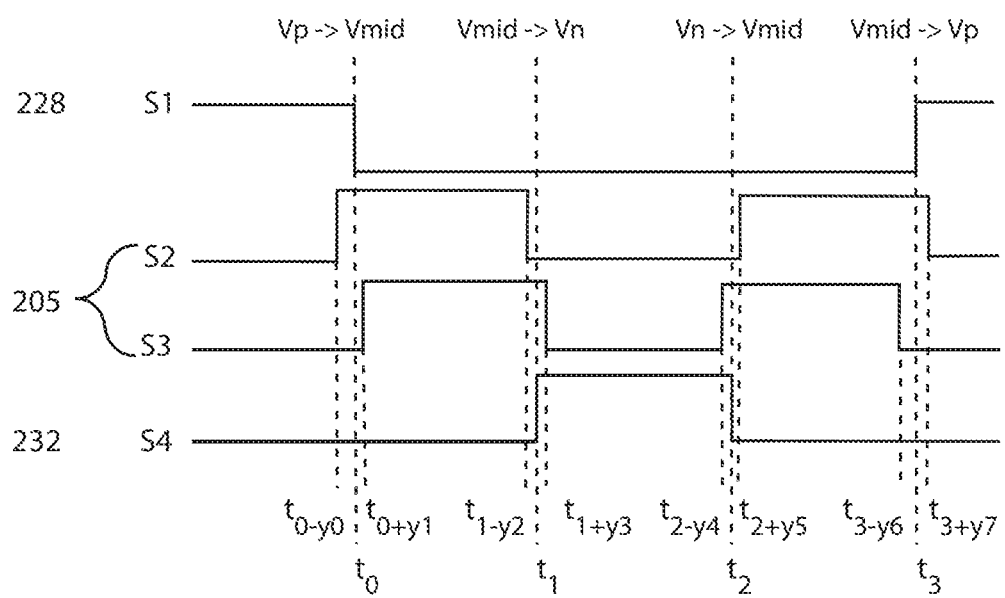
FIG. 2B is a graphical illustration of timing diagram for signals generated to control and exemplary implementation of the inner cell illustrated in FIG. 2A.

In FIG. 2B, at a time instant $t_0$, a first a drive signal 309 has a falling edge which indicates that the switch element 228 (S1) is changing from the ON state to the OFF state. At a time instant of $t_{0-y0}$, where "y0-y7" are finite time quanta occurring before or after time instant "t." For example, $t_{0-y0}$ occurs prior to $t_0$, in which a first portion of the switch element 205 (S2) (e.g., power switch 236) is activated via a second drive signal 313.

In actuality, as can be appreciated by one of skill in the art that the time instant $t_{0-y0}$, the switch element 205 is still controlled in an OFF state. The switch element 205 is controlled in an ON state only when both sub-switches 234 and 236 are turned on. At a finite amount of time after $t_0$, for example at $t_{0-y1}$, a second portion (e.g., the power switch 234) of the switch element 205 is turned on via a third drive signal 311. At the time instant $t_{0+y1}$, the switch element 205 formally changes to the ON state.

Similarly, at a time instant of $t_{1-y2}$, prior to $t_1$, the first portion of the switch element 205 (S2) (power switch 236) is deactivated during an OFF state via the second drive signal 313. At a time instant $t_1$, a fourth drive signal 315 turns the switch element 232 (S4) to an ON state. At a time instant $t_{1+y3}$, the second portion of the switch element 205 (S3) (power switch 234) is formally turned to an OFF state via the third drive signal 311. In the embodiments, it can be appreciated by those skilled in the art that time quanta $y_0$-$y_7$ can all be different values. The process described above is repeated for remaining states t2~t3. In this manner, the rising and falling edges of 228, 205, and 232 are substantially non-overlapping.

Figure 2C:
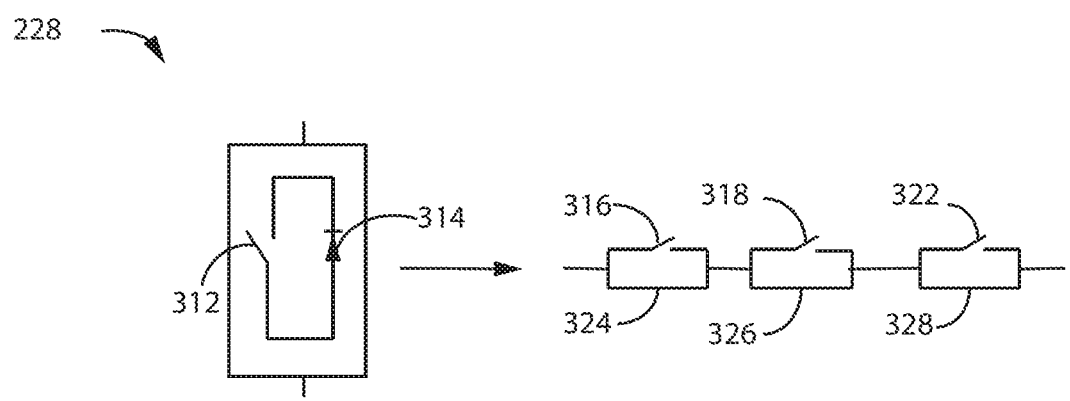
FIG. 2C is a block diagram illustration of an implementation of a power switch used within switch elements in the exemplary NPP cell illustrated in FIG. 2A in accordance with the embodiments.

FIG. 2C is a block diagram illustration of a power switch 228 of FIG. 2A in accordance with the embodiments. In one embodiment, the switch element 228 can be configured to include any type of the power switches (internal to switch elements). For example, the switch elements 238, 228, 232, 242 (see FIG. 4 discussed below) can be configured to precisely match the configuration of the switch element 228.

More specifically, in one embodiment, the switch element 228 includes a power switch 316, a power switch 318, and an nth power switch 322, where n is equal to or larger than two. By way of example, the power switches 316 and 318 are connected in parallel with respective anti-parallel diodes 324, and 326. The n-th power switch 322 is connected in parallel with an n-th anti-parallel diode 328. In some conditions, each power switch can be integrated with its corresponding anti-parallel diode to form a single switch.

Since the power switches 316, 318, and the n-th power switch 322 are connected in series between the DC lines 206 and 208, each of the switches is applied with a portion of the DC voltage. Thus, low nominal voltage switches can be used to replace a single power switch 312, which has a high nominal voltage. As shown in FIG. 2C, the single power switch 312 is also integrated with an anti-parallel diode 314. Additionally, a higher number of power switches provides a greater level of redundancy.

By way of example only, and not limitation, power switches described in the embodiments can be formed of metal oxide semiconductor field effect transistor (MOSFET), insulated gate bipolar transistor (IGBT), and integrated gate commutated thyristor (IGCT), to name a few.

Figure 3:
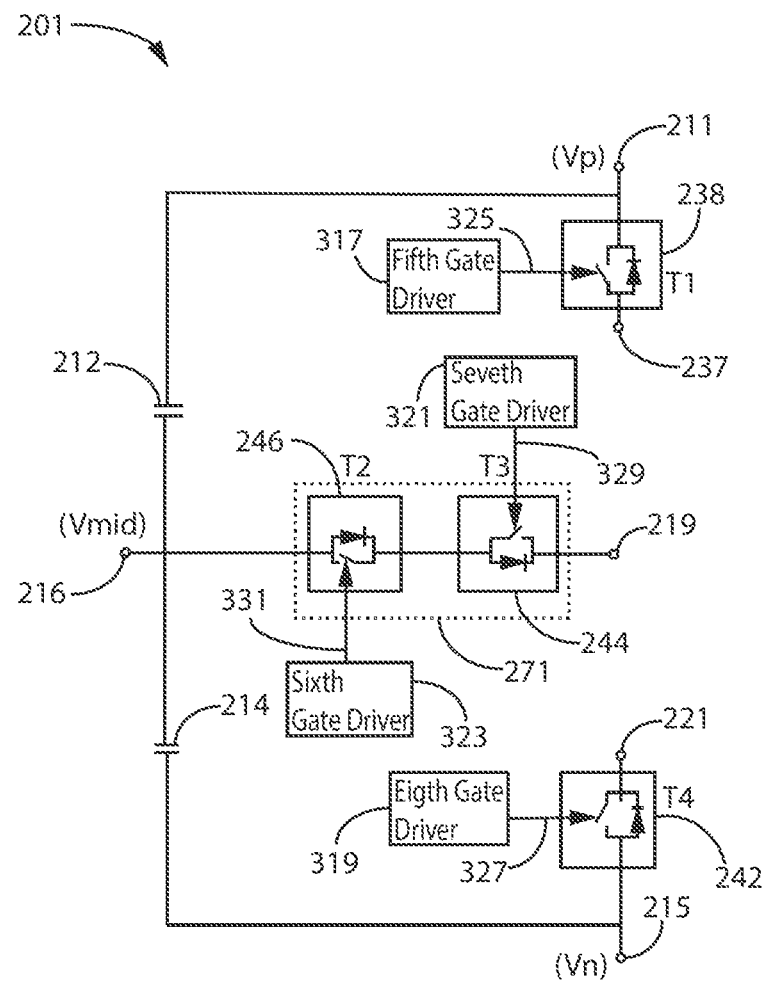
FIG. 3 is an exemplary block diagram illustration of an outer NPP cell constructed in accordance with the embodiments.

FIG. 3 is a block diagram illustration of the outer cell 201 discussed above, according to the embodiments. FIG. 3 also depicts gate drivers associated with power switches within each of the switch elements 238, 242, and 271. As noted earlier, the multiple devices in the outer cell 201 are controlled to perform switching operations in a mutually exclusive manner.

More specifically, the switch element 238 is configured to be switched on/off according to switching drive signals 325 provided from a gate driver 317. The switch element 242 is configured to be switched on/off according to switching drive signals 327 provided from a gate driver 319. The power switch 244, within the switch element 271, is configured to be switched on/off according to switching drive signals 329 provided from a gate driver 321. The power switch 246 is configured to be switched on/off according to drive signals 331 provided from a gate driver 323.

In some embodiments, the switching drive signals 329 and 331 operate synchronously and are generated from a single controller. To ensure the proper commutation of the switch elements 238 or 242, and to ensure dead time in order to avoid short-circuits of the flying capacitors, the switching instants of the drive signals 329 and 331 are adjusted. For example, the drive signals 329 and 331 may be adjusted accordingly in a manner to advance switching or delay switching of the sub-switches 246 and/or 244 in switch element 271 in a substantially small time quanta relative to the drive signals supplied to the switch element 238 or 242.

Figure 4:
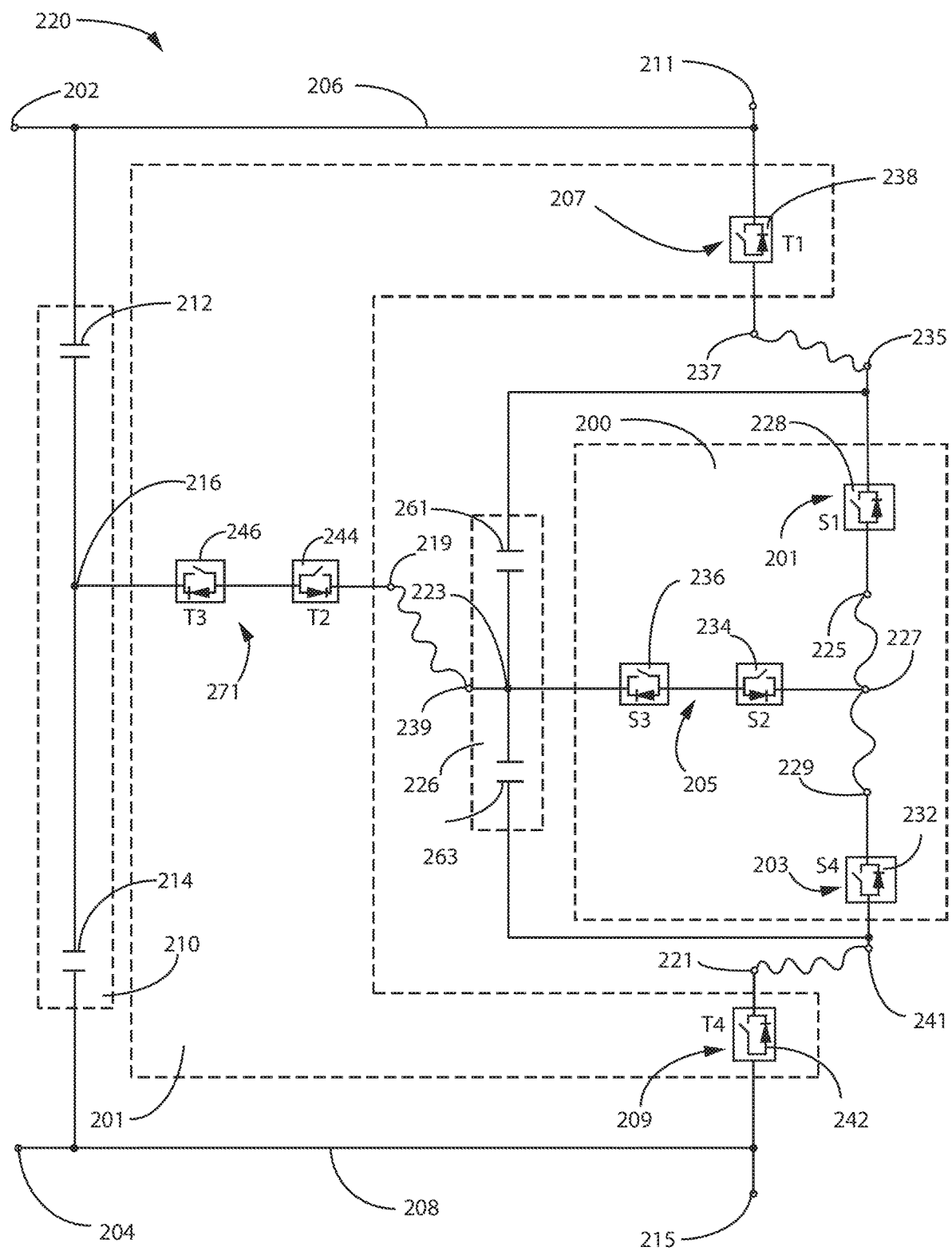
FIG. 4 is a more detailed block diagram illustration of a single 5-level nested NPP single phase cell constructed from a nested combination of FIGS. 2A and 3.

FIG. 4 is a more detailed block diagram illustration of a single 5-level nested NPP single phase cell 220 constructed from a nested combination of FIGS. 2A and 3. The components, structure and operation behavior within the inner cell 200 and the outer cell 201 are virtually identical. This technique enables the expansion of the 3-level topology of a basic NPP cell to achieve outputs having five levels (as in the case of the single phase cell 220), or seven, nine, eleven, or more levels.

By way of example, in another embodiment of the present invention, nested structures can be hybrid, for example, having a 2-level cell or 3-level NPC cell being wrapped within the 3-level NPP cell. Many other hybrid nested structures are possible and are within the spirit and scope of the present invention.

In FIG. 4, the outer cell 201 includes capacitors 212 and 214. In the illustration of FIG. 4, the capacitors 212 and 214 form a DC link 210. In other embodiments, the capacitors 212 and 214 need not be configured to form a DC link. The capacitors 212 and 214 are essentially identical to the capacitors 261 and 263 of the inner cell 200 as "flying" capacitors. Similarly, the power switches 238, 242, 244, and 246 of the outer cell 201 are essentially equivalent or identical to the power switches 228, 232, 234, and 236 of the inner cell 200.

In FIG. 4, the switch element 205 is a bi-directional switch which conducts bidirectional current and blocks bidirectional voltage. It can be implemented as two reversely coupled unidirectional power switches 234 and 236. However, the present invention is not limited to this particular power switch implementation. In the example of FIG. 4, the power switches 234 and 236 are controllable via the control device 140 to allow electrical currents having opposite directions to flow therethrough. The switch elements 228 and 232 can conduct bidirectional current and block unidirectional voltage.

One of the terminals 235 of the switch element 228 is coupled to a terminal of the capacitor module 226, or more specifically, to a terminal of the flying capacitor 261. This coupling permits the terminal 235 to function as a first input-cascading terminal. The other terminal 225 of the switch element 228 functions as a first output-cascading terminal and is able to be coupled to the output terminal 260.

One terminal of the switch element 232 is coupled to another terminal of the capacitor module 226, more specifically to one terminal of the flying capacitor 263, permitting the terminal 241 to function as a second input-cascading terminal. The connecting terminal 229 functions as a second output-cascading terminal and is also able to be coupled to the output terminal 260.

A terminal 239 of the switch element 205 is coupled to a connection point 239 of the DC link 226 and functions as a third input-cascading terminal. Another terminal 227 of the switch element 205 functions as a third output-cascading terminal and is also couplable to the output terminal 260.

In a first exemplary scenario, the input-cascading terminals 235, 239, and 241 can be respectively coupled to three output-cascading terminals of another NPP cell (e.g., the cell 201). In this first exemplary scenario, the cell 200 is the inner cell, and the cell 201 is the outer cell, as noted earlier.

In a second exemplary scenario, the output-cascading terminals 225, 227, and 229 can be respectively coupled to three input-cascading terminals of another cell. In this second scenario, however, the cell 200 functions as the outer cell and the other cell functions as the inner cell. The cell 201 could similarly function as an inner cell. Nesting NPP cells in cascading arrangements allows expansion of the number of achievable voltage output levels.

During operation and control of the inner cell 200, when a switch element is activated, a voltage is output therefrom. For example, when the switch element 228 (oriented in the same direction as the switch element 232) is activated, the terminals 235 and 225 connect together. When the switch element 205 is activated, the terminals 239 and 227 connect together. Similarly, when the switch element 232 is activated, the terminals 229 and 241 connect together.

In the embodiments, cell control is achieved by activating and deactivating the switch elements one at a time. For purposes of illustration, components within the inner cell 200 have an S-level designation, and components within the outer cell 201 have a T-level designation. Transitioning from one switching state to the next switching state, within respective S and T levels, is accomplished through coordination of the control signals 106 provided to each cell from the control device 140.

By way of example, each of the control signals 106 can include multiple control signals sent simultaneously to gate drivers within individual power switches of each switch element, for all power switches in a particular level. For example, one signal to power switches within the switch element 228 (S1), another signal to 232 (S4), and a third signal to switch element 205, including power switches 236/234 (S2/S3). Also, one signal to 238 (T1), another signal to 242 (T4), and a third signal to 244/246 (T2/T3).

This coordinated signal control ensures that no more than one switch element in the S-level inner cell 200 is ON at a given time. Similarly, no more than one switch element in the T-level outer cell 201 is ON at a given time The nested cell structures within the phase leg 220, combined with use of the control device 140, produces multi-level output voltages of higher power quality and power density. The structure of these nested cells can be replicated, with, each cell producing a predetermined number of outputs, to expand the number of voltage output levels.

For example, and as an expansion of the discussion above in relation to FIG. 1A, the inner cell 200 can be configured and controlled to provide an output voltage having three levels. Similarly, the outer cell 201 can be configured and controlled to provide an output voltage having three levels. Output voltage level of the phase leg with nested cells would be 2*cell number+1, when both inner and outer cells are 3-level cells.

In the exemplary illustration of FIG. 4, the inner cell 200 and the outer cell 201 provide 5-level output voltages. More specifically, and by way of example only, and not limitation, capacitors and switch elements within each of the cells 200 and 201 are structured to have six connecting terminals. The connecting terminals of one cell structure connect with corresponding connecting terminals of the other cell structure.

Similar to the arrangement of the inner cell 200, the outer NPP cell 201 includes switch elements 238, 242, and 271. The switch element 238 has a connecting terminal 237 (e.g., interior) at one end and a connecting terminal 211 (e.g., exterior) at its other end. By way of example, the switch element 242 is oriented in the same direction as the switch element 238. The switch element 242 has a connecting terminal 221 (interior) at one end and 215 (exterior) at its other end. The switch element 271 includes power switches 244 and 246 that are reversely coupled in series.

Additionally, the switch element 271 has a connecting terminal 219 (interior) at one end. A connecting terminal (exterior) of the switch element 271 is coupled to a connecting terminal 216 defined between the capacitors 212 and 214 of the capacitor module 210. In addition, the ends of the capacitor 212 are coupled to the two connecting terminals 211 and 216 respectively. Similarly, two ends of the second capacitor 214 are coupled to the two connecting terminals 216 and 215, respectively.

By way of review, nested NPP cell structures are formed by coupling the connecting terminals 237 and 235 together, coupling the connecting terminals 219 and 239 together, and coupling the connecting terminals 241 and 221, together. In other embodiments, similar connections can be made to form a higher level converter topology by connecting more than three six-terminal converter modules.

In FIG. 4, the connecting terminals 225, 227, 229 (i.e., interior terminals) of the inner cell 200, are connected to the AC port 260 for receiving or providing AC voltage. Additionally, connecting terminal 211 is coupled to the DC port 202 through the first DC line 206. The connecting terminal 215 is coupled to the DC port 204 through the DC line 208. In this manner, the connecting terminals 211 and 215 are configured to receive or provide DC voltages.

Figure 5A:
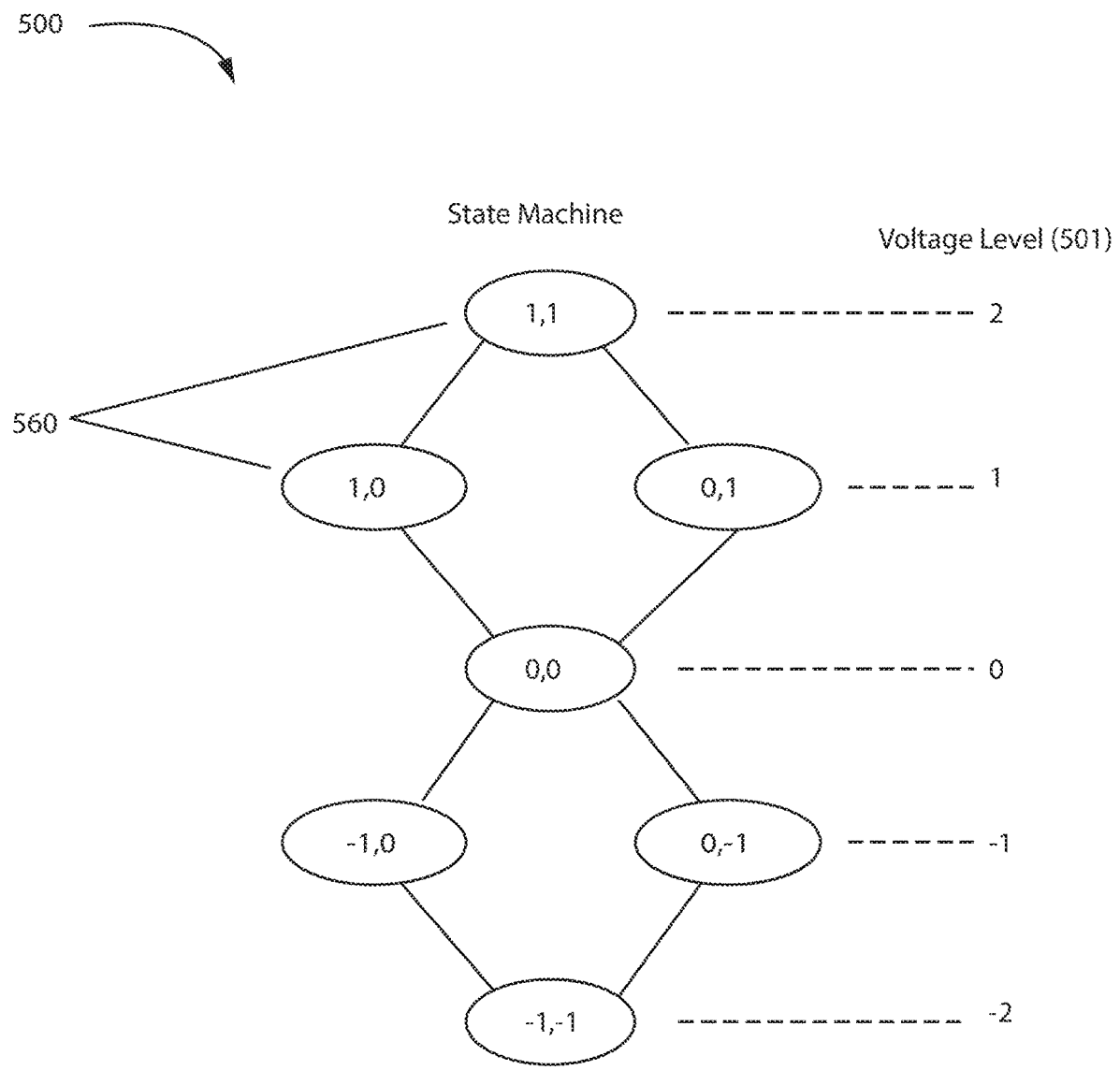
FIG. 5A is an exemplary state diagram of switching states used to control the exemplary nested NPP single phase cell illustrated in FIG. 4.

FIG. 5A is an illustration of an exemplary state machine voltage level diagram for two nested cells structure (inner cell 200 and outer cell 201). In FIG. 5A, a first digit within each oval 560 represents a state of the outer cell 201. A second digit within the oval 560 represents a state of the inner cell 200. As depicted in 5A, for example, two equally valid states can occur to produce the same output voltage levels of 1 and −1, respectively, as illustrated in greater detail below with reference to FIGS. 5B and 5C.

FIG. 5B is a tabular illustration of exemplary switching states for controlling the inner and outer cell structures 200 and 201 of FIGS. 5A and 5B configured in the phase leg 220 of FIG. 4. The first phase leg 220 can be controlled to provide an output voltage having five different voltage levels 501. The voltage levels 501 are produced by selectively controlling the outer cell 201 switches (T-level switches) via switching states 502 and the inner cell 200 switches (S-level switches) via switching states 504.

Figure 5C:
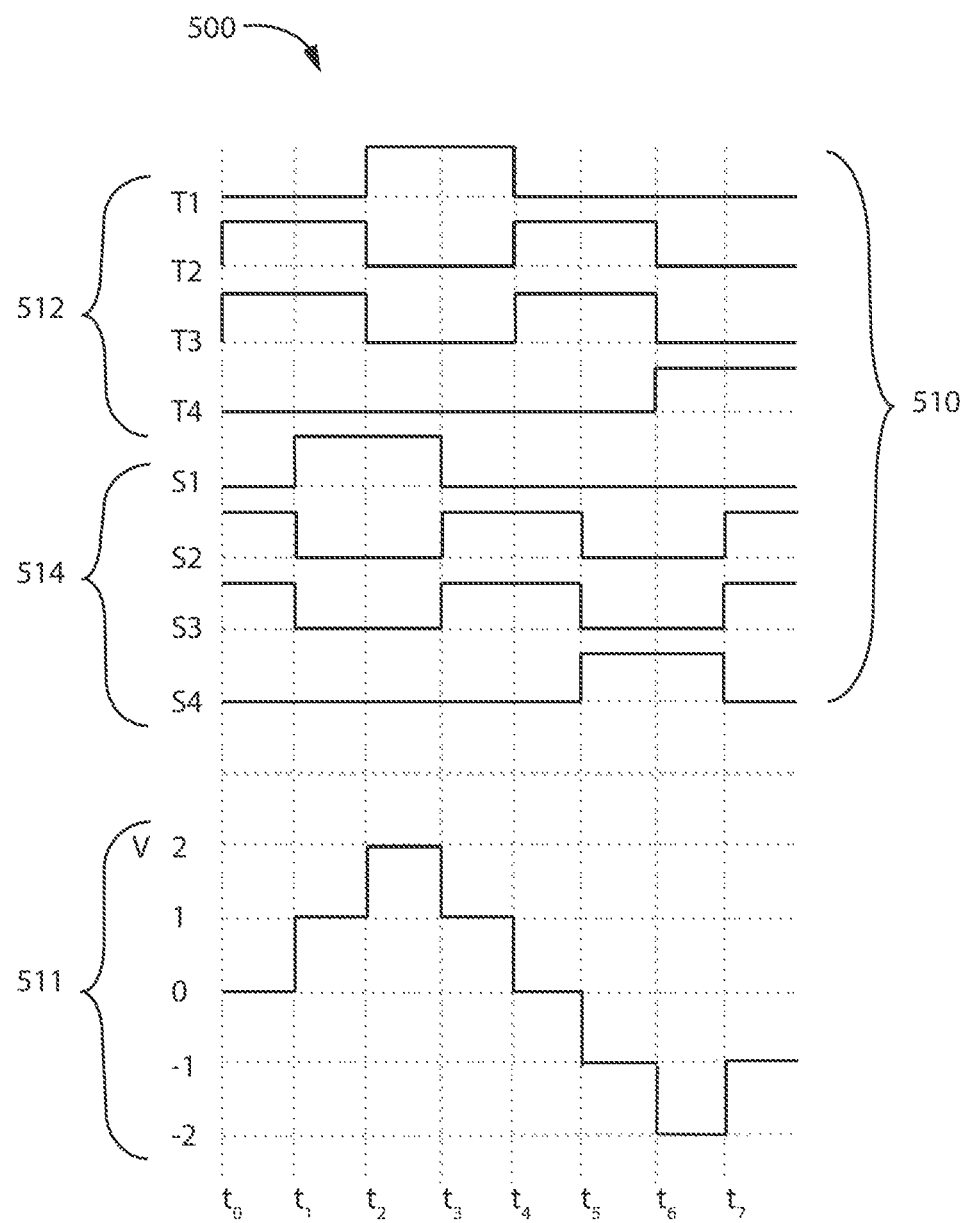
FIG. 5C is an illustration of exemplary timing diagrams, along with an exemplary output waveform, associated with the switching states of FIGS. 5A and 5B.

FIG. 5C is a graphical illustration including exemplary timing signals 512 and 514 and the resultant output voltage waveform 511. In FIG. 5C, for example, timing signals 512 are representative of switching states 502 (see FIG. 5B) for the components (FIG. 3) within the outer cell 201. Similarly, timing signals 514 are representative of switching states 504 for components (FIG. 2A) within the inner cell 200.

The sequential application of the timing signals 512 and 514 to the outer and inner cells 201 and 200 produces the output voltage having multiple levels and a selectable pattern. More specifically, the pattern of the output voltage 511 can resemble the sinusoidal pattern. The waveform 511 is produced as a multi-level output of the first phase leg 220 of the multi-phase converter 700 of FIG. 7 (or 122 of FIG. 9), depicted in FIG. 5C. Other non-sinusoidal waveform patterns are achievable and are within the spirit and scope of the present invention.

By way of example, in the exemplary illustration of FIG. 5C, the timing signals 512 are applied via the respective control signals 325, 327, 329, and 331, as described above. Similarly, the timing signals 514 are applied via the respective control signals 309, 315, 311, and 313. The control signals, shown in FIGS. 5A and 5B, can be sub-signals of the control signals 106, generated by the single control device 140. Alternatively, the control signals, shown in FIGS. 5A and 5B, can be generated by multiple control devices.

Figure 5D:
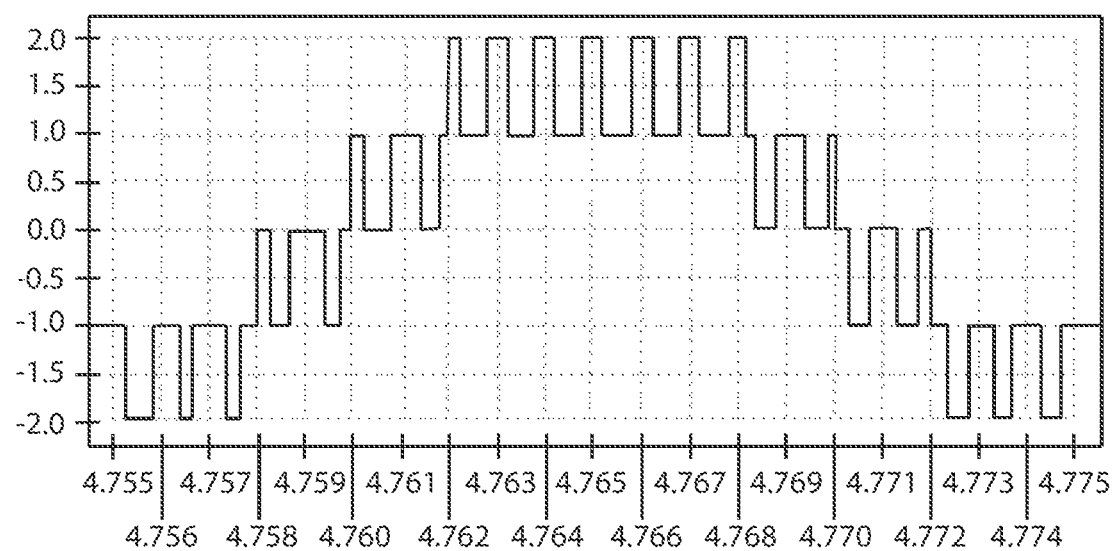
FIG. 5D is an illustration of another exemplary timing diagram in accordance with FIG. 4.

FIG. 5D is a illustration of a output voltage waveform 550 of the multi-phase converter in accordance with the embodiments. As shown in FIG. 5D, through the use of a converter having a nested cell structure and multiple phase legs, one phase leg of the converter can provide an output voltage having five or more levels in the form of substantial resemblance of desired alternate current waveform.

In the embodiments, flying capacitor voltage is maintained using redundant switching states. As used herein, the expression "redundant switching states" means that the same commanded level output may be provided by supplying switching signals having different combinations of switching states to the plurality of the power switches within the convert. Use of redundant switching states enables the pulse pattern of the individual pulse signals to be selected such hat additional control objectives are achieved in addition to the desired output voltage waveforms. Those additional control objectives may include (a) regulation of flying capacitor voltage to a pre-determine value; and (b) balance of thermal stress of power switches in different switch positions.

In the illustrative embodiments, the output voltage of the nested cell structures is dependent upon the degree to which the voltage of the flying capacitors, such as the voltages cross flying capacitors 261/263 can be regulated to a pre-demined value. By way of example, this regulation is achieved by actively controlling the current flowing through the flying capacitors through use of redundant switching states to charge and discharge the flying capacitor.

Figure 6A:
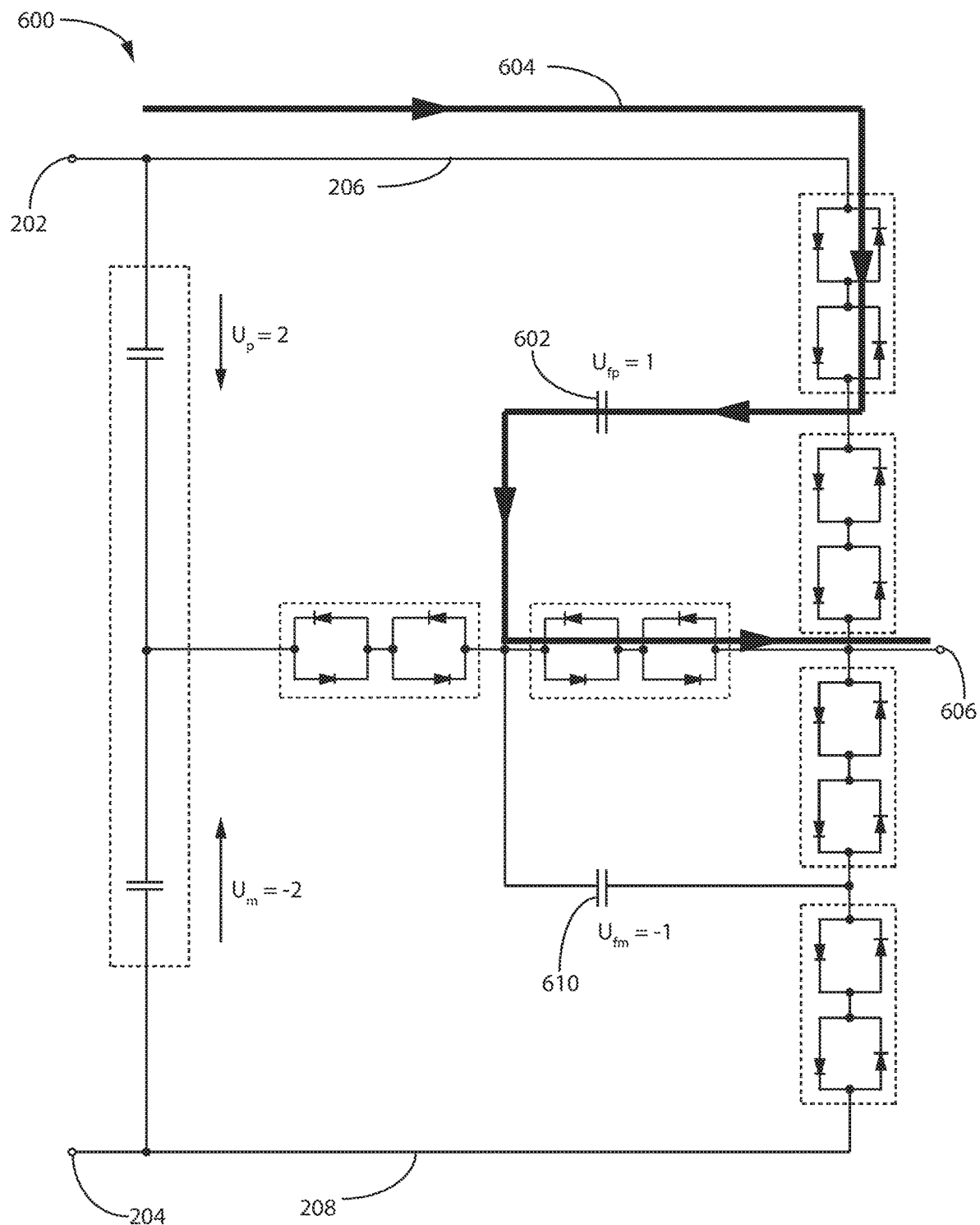
FIG. 6A is an illustration of a first switching state flow path through the inner and outer 3-level NPP cell, in accordance with the embodiments.
Figure 6B:
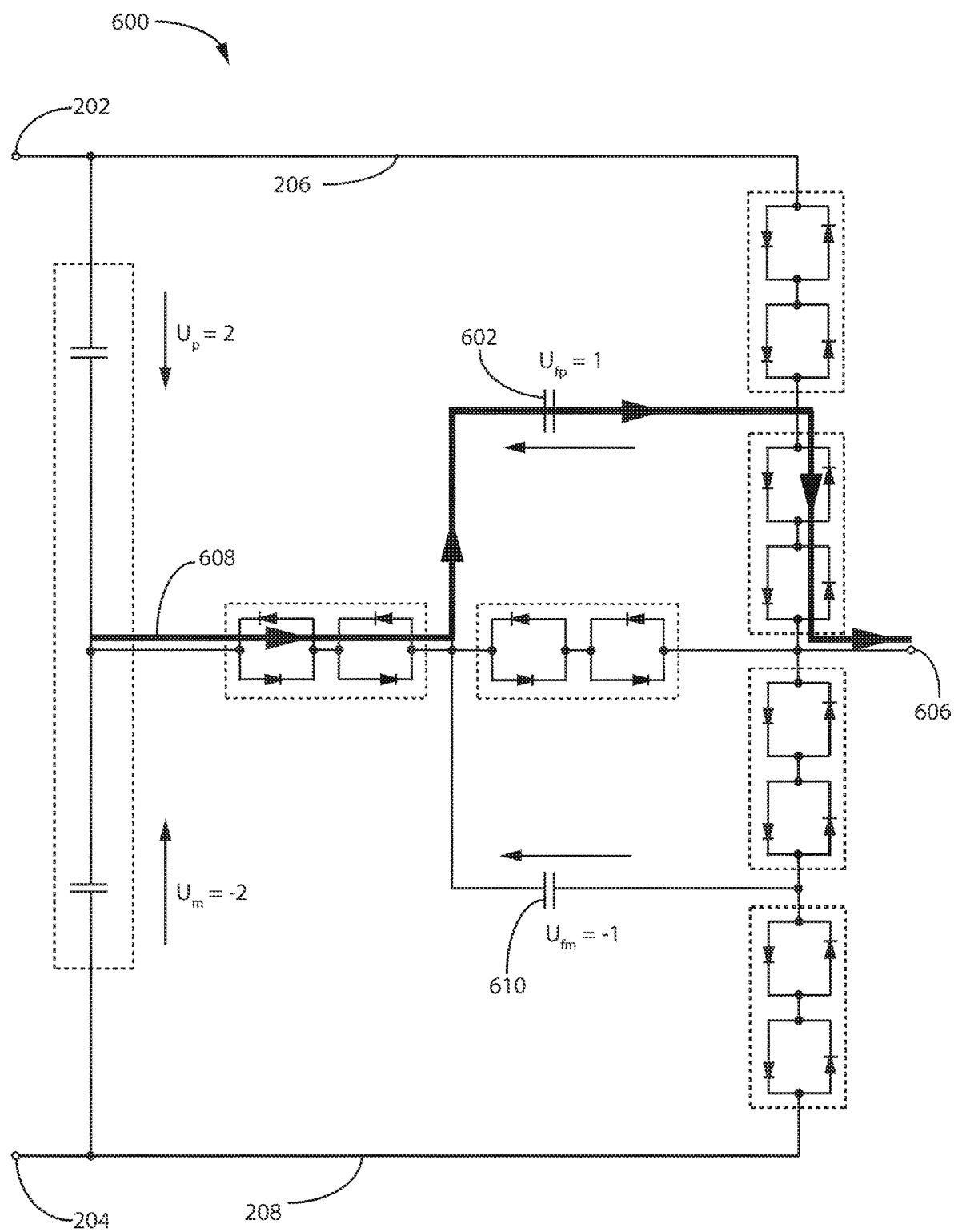
FIG. 6B is an illustration of a second (redundant) switching states flow path through the inner and the outer 3-level NPP cell of FIG. 6A.

More specifically, FIG. 6A is ea illustration of a first stage current flow path through a generic power converter phase leg 600, similar to due phase leg 220, of FIG. 4, in accordance with another embodiment. FIG. 6B is an illustration of a second stage flow path through the generic power converter phase leg 600 of FIG. 6A.

By way of background, the final voltage output of a nested cell structure, such as the nested structure 220 of FIG. 4, is the sum of the output from the outer three-level cell 201 and the inner three-level cell 200. That is, the final voltage output is the sum of the states of the two three-level NPP cells. Use of redundant switching states leverages due internal structure of the nested cells to achieve additional control and operation objectives, such as regulation of flying capacitor voltage and/or balance of thermal stress an power switches.

For example, in the structure 220 to generate a "1" as the voltage at the output 260, the output float the outer cell 201 and the inner cell 200 can be "1" and "0," respectively. Alternatively, the output can be "0" and "1," producing an identical output voltage level. However, the current paths going to the corresponding flying capacitors would be opposite, causing one to change, the other to discharge the flying capacitor 602.

In FIG. 6A, flying capacitor 602 is a capacitor through which a need exists for regulating operational characteristics therein, such as voltage. A first current path 604 depicts current flowing into the flying capacitor 602 and to an output 606. That is, in FIG. 6A, when an output voltage level of "1" is required at the output port 606, either the first current path 604 or a second current path 608 can be selected. Due to the switching states redundancy for operating the plurality of switch elements, either of the first or second current paths 604 and 608 (see FIG. 6B) can be formed such that the flying capacitor 602 can be charged and/or discharged for regulation of its voltage.

For example, flying capacitor voltage information signals received by a controller 140' (described below) can indicate that the flying capacitor 602 is in an overvoltage condition or having a voltage greater than a pre-determined voltage level. As a result, the controller is configured to generate the individual pulse signals having a first combination of switching states, depicted in FIG. 6B, to allow the flying capacitor 602 to be discharged.

Alternatively if the flying capacitor voltage information signals received by the controller could indicate that the flying capacitor 602 is in an under-voltage condition or having a voltage less than a pre-determined value. Here, the pulse pattern generator is configured to generate the individual pulse signals having a second combination of switching states, as depicted in FIG. 6A, to allow the flying capacitor 602 to be charged. Consequently, the voltages at the flying capacitor 602 and the flying capacitor 610 can be dynamically regulated in every switching cycle.

Figure 7:
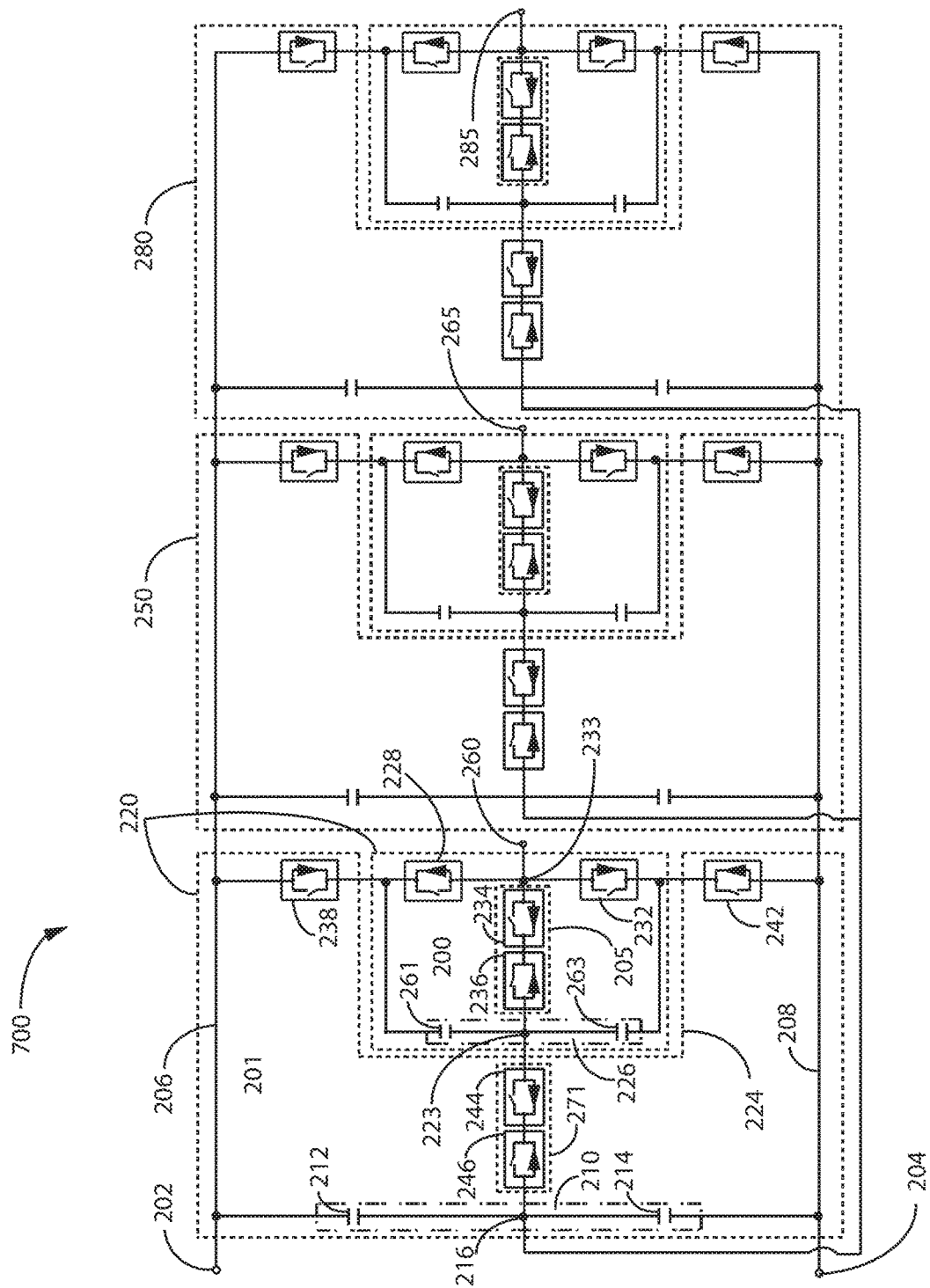
FIG. 7 is a block diagram illustration of exemplary 5-level nested cells structures used in a multiphase converter in accordance with the embodiments.

FIG. 7 is an exemplary block diagram illustration of a multiphase converter 700 formed by three separate phase legs 220, 250, and 280, in accordance with the embodiments. The phase leg 220 includes the single 3-level NPP cell 200 of FIG. 1A configured as an inner cell wrapped within an outer cell 201. Each of the phase legs 220, 250, and 280 is a single phase (e.g., 120° phase shift from each other) of a multiphase converter. For purposes of illustration and simplification, FIG. 7 is discussed within the context of the converter 700. Greater details of nested cell structures were provided in the discussion above, particularly in the discussion of FIG. 4 above.

In FIG. 7, each of the phase legs 220, 250, 280 is coupled between first and second DC lines 206 and 208 for receiving a DC voltage from a DC link 210 and providing an output voltage at corresponding output ports 260, 265, and 285. Although the detailed discussion below primarily addresses the first phase leg 220, the discussion equally pertains to phase legs 250 and 280. As such, a detailed discussion of the phase legs 250 and 280 will not be provided herein.

The phase legs 220, 250, and 280 provide corresponding first, second, and third phase AC voltages through output ports 260, 265, and 285, respectively. By way of example, the first, second, and third phase AC voltages can be offset from one another by 120 degrees.

When the converter 700 is implemented as an AC-DC converter, the output ports 260, 265, and 285 can be alternatively configured as AC input ports to receive input AC voltages. Similarly, first and second ports 202 and 204 can be configured as DC output ports to output DC voltages. For DC-AC and DC-DC conversions, those ports can be configured and connected accordingly in a similar fashion.

Figure 8:
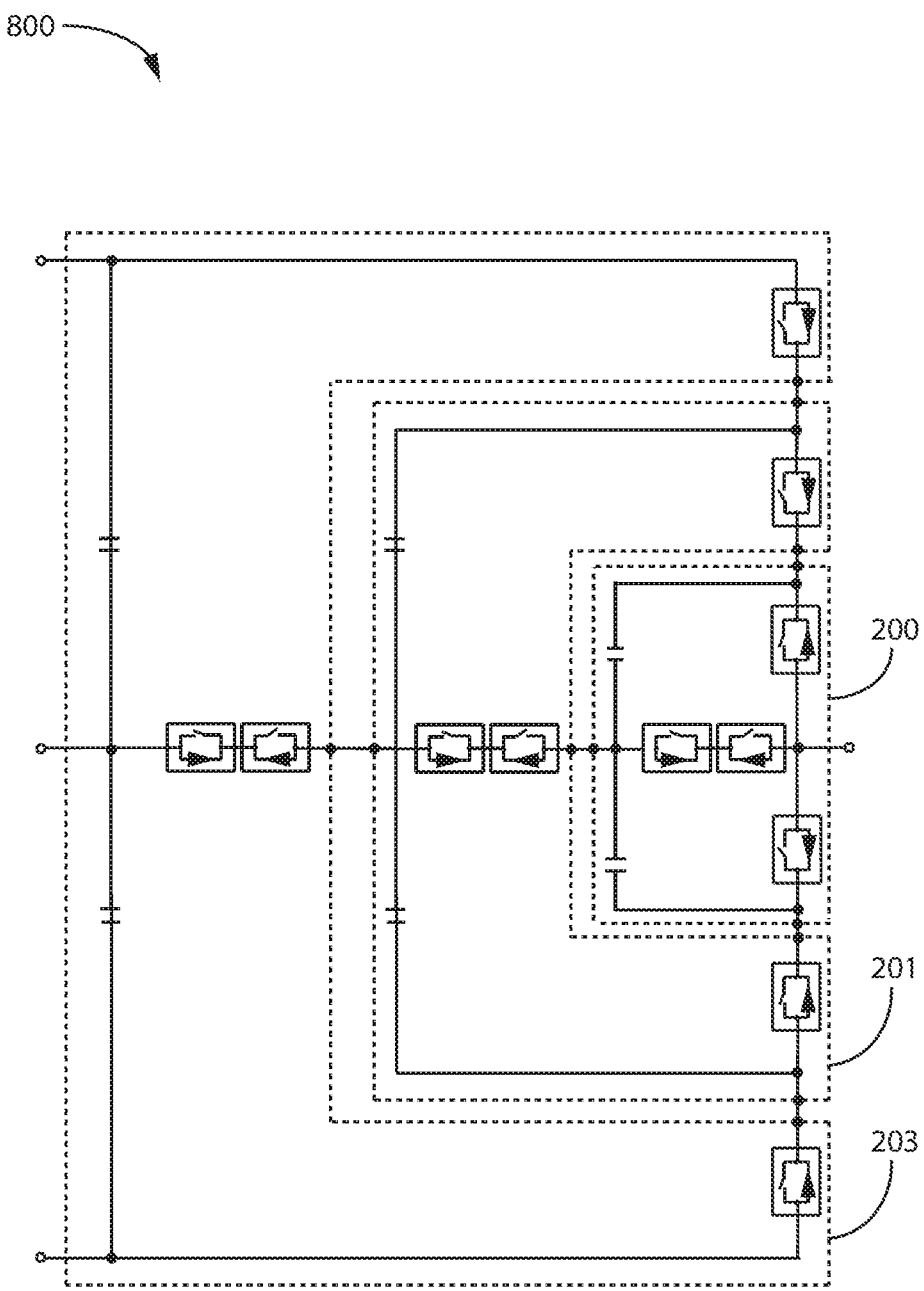
FIG. 8 is an illustration of an exemplary 7-level nested NPP cell in accordance with an alternative embodiment of the present invention.

FIG. 8, for example, is an illustration of an exemplary 7-level nested NW structure 800 in accordance with an alternative embodiment of the present invention. That is, the NPP structure (e.g., phase leg) 800 is capable of producing a 7-level output voltage. The NPP structure 800, in accordance with the NPP cell structures described above, includes the cells 200 and 201, described above. However, the structure 800 also includes a third cell—an exterior cell 203. Thus, the structure 800 includes three basic 3-level NPP cells in a nested arrangement.

Figure 9:
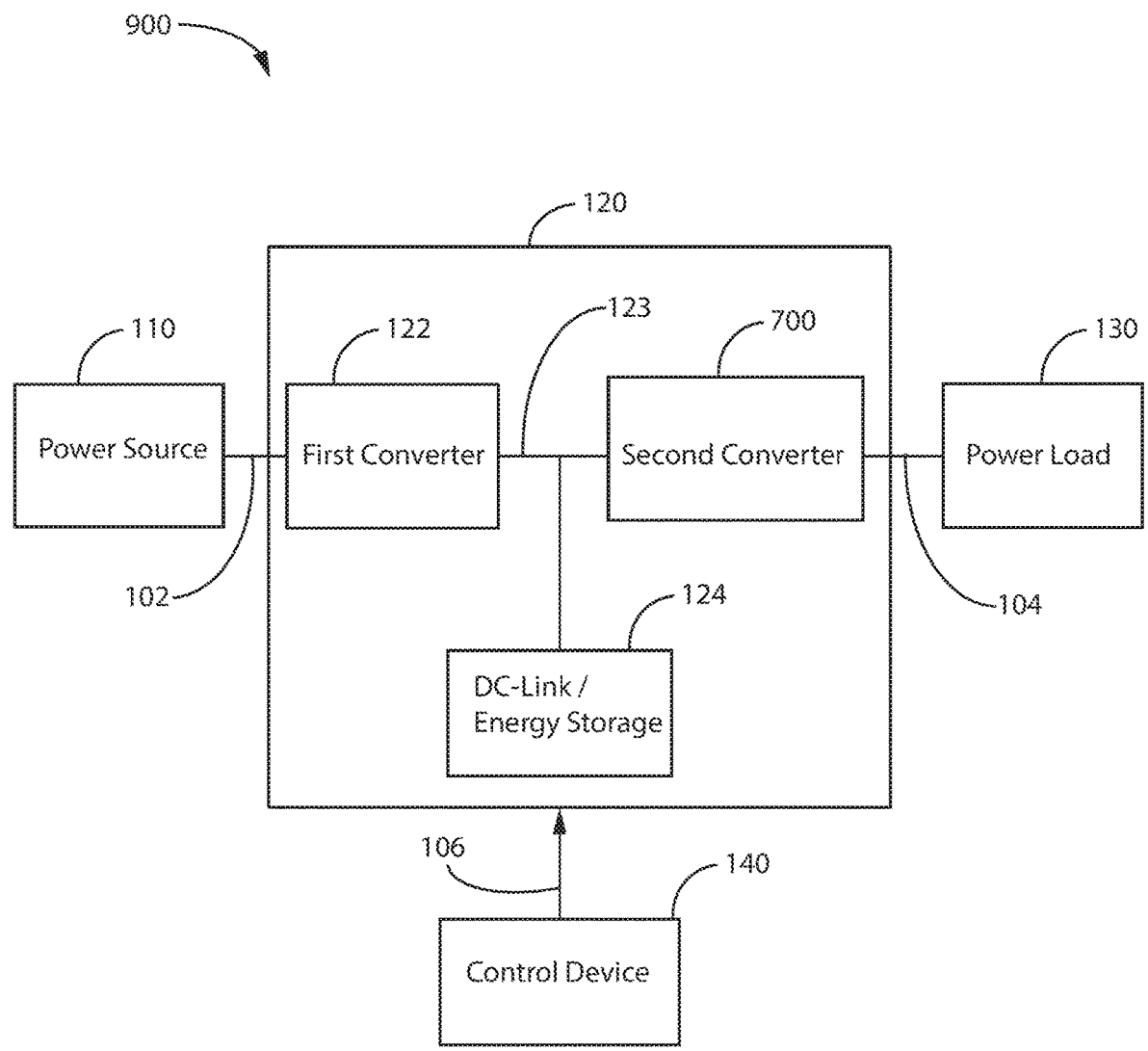
FIG. 9 is an exemplary block diagram illustration of the exemplary power conversion system in which embodiments of the present invention can be practiced.

FIG. 9 is a block diagram illustration of an exemplary power conversion system 900 in which embodiments of the present invention can be practiced. By way of example, and not limitation, the system 900 includes a nested NPP topology. In FIG. 9, the system 900 is a multi-level conversion system for achieving higher power quality and power density. The system 900 includes a power converter module 120 coupled to the control device 140.

The exemplary power converter module 120 includes a first converter 122, a DC link/energy storage device 124, and a second converter 700. By way of example only, the first converter 122 converts a first AC power 102 from a first power device, such as a power source 110 (e.g., power grid) into DC power 123 (e.g., DC voltage). The converters 122 and 700 can include at least one basic 3-level NPP cell configured in a nested topology as discussed above, with reference to FIGS. 1A-2B.

A DC-link component within the device 124 can include one or more capacitors for filtering the DC voltage 123 output from the first converter 122 to supply a filtered DC voltage to the second converter 700. In the exemplary power converter module 120, the second converter 700 converts the filtered DC voltage into a second AC voltage 104 (discussed in greater detail below). The second AC voltage 104 is output to a second power device, such as a power load 130 (e.g., an AC electric motor).

More specifically, the power conversion system 900 includes at least one 3-level NPP cell configured in a nested structure that provides more efficient multi-level power conversion for high power and, as well as for low and variable frequency applications. In the example of FIG. 9, fixed-frequency electric power 102 (e.g., 50 or 60 hertz AC) is converted into variable-frequency electrical power 104. The variable-frequency electrical power 104 is supplied to the power load 130 (e.g., such as a motor). The power conversion system 900 can also include an energy storage component within the device 124, for storing the DC power provided from the first converter 122.

Figure 10:
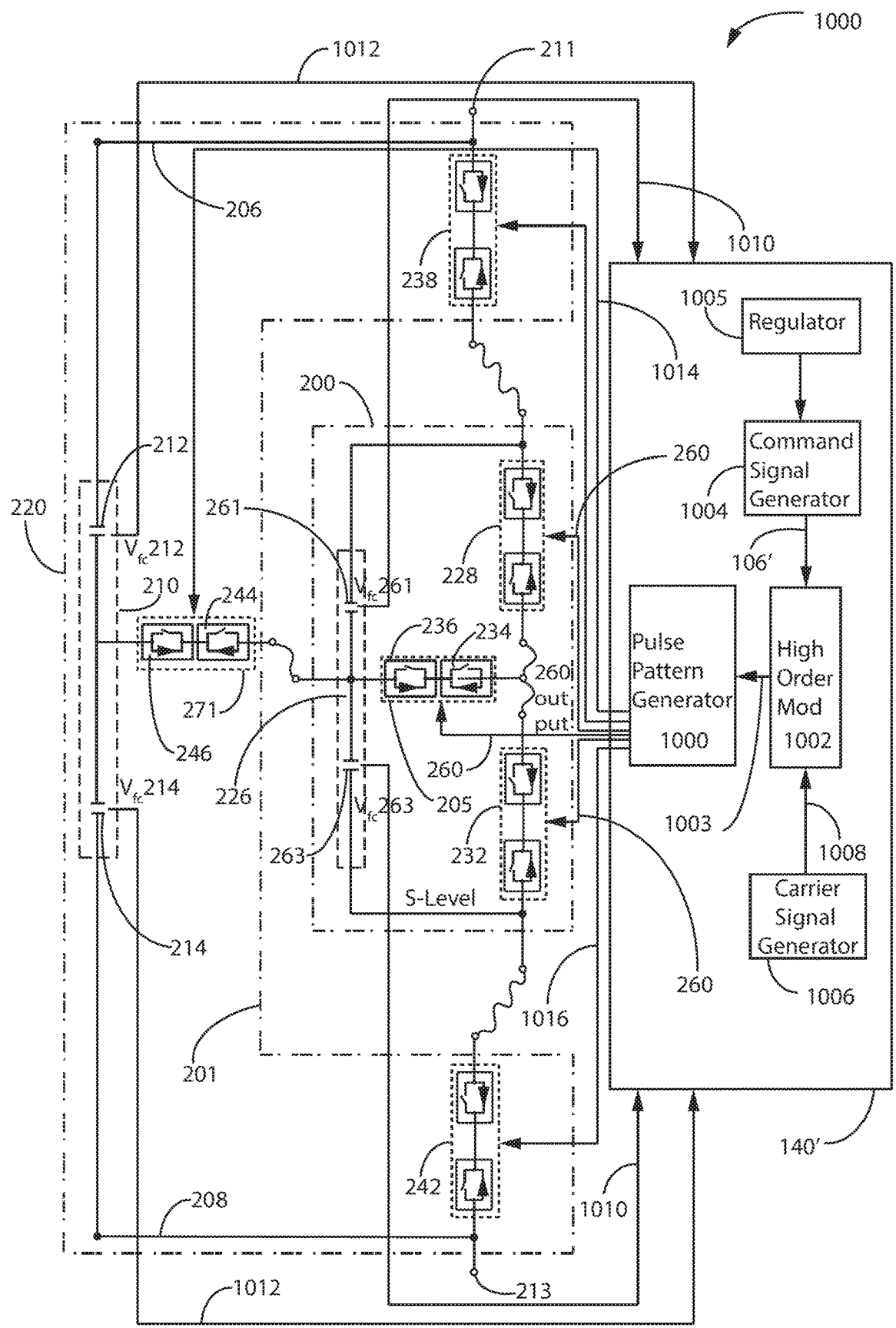
FIG. 10 is a block diagram illustration of a control device and nested cell structure constructed in accordance with an alternative embodiment of the present invention.

FIG. 10 is a block diagram illustration 1000 of a control device 140' and a nested cell structure 220 constructed to implement the redundant switching state technique noted above. The system of FIG. 10 is configured to balance fly capacitor voltages by actively regulating the current flowing through the flying capacitors 261/263 of the capacitor module 226 through use of redundant switching states.

In FIG. 10, the control device 140' is similar to the control device 140 of FIGS. 1A and 9. The control device 140', however, includes additional functionality for implementing the redundant states process discussed above.

The control device 140' includes a high-order modulator 1002 configured to generate initial multi-level pulse signals 1003 by one or more modulation methods. The initial multi-level pulse signals 1003 are not directly transmitted for driving the nested phase leg 220. Instead, the initial multi-level pulse signals 1003 are used for generating individual pulse signals which in turn are used for driving a plurality of switch elements of the phase leg 220.

In this manner, the phase leg 220 can provide an output voltage and/or current having a waveform corresponding to the waveform of the initial multilevel pulse signals 1003. For example, the high-order modulator 1002 can be configured to generate the initial multilevel pulse signals 1003 having five, seven, nine, eleven or more levels, corresponding to the output of the phase leg 220.

In one embodiment, the modulator 1002 is configured to generate the initial multilevel pulse signals 1003 by a multi-carrier modulation method such as, for example, a level-shifted pulse width modulation (LSPWM) method. In other embodiments, the high-order modulator 1002 may be configured to generate the initial multilevel pulse signals 1003 using other modulation methods well known in the art.

In FIG. 10, the modulator 1002 can receive a command signal 106' provided from a command signal generator 1004. The command signal 106' may include a voltage command signal having a waveform corresponding to that of a desired voltage. For example, the voltage command signal 106' can have a sine waveform corresponding to a desired AC output voltage of the nested cell 220. The command signal 106' can also include a frequency command signal indicative of a desired output frequency.

In the embodiments, the high-order modulator 1002 can also receive multiple carrier signals 1008 provided from a carrier signal generator 1006. For example, the carrier signal generator 1006 can generate multiple carrier signals, each carrier signal having a specific waveform shape (e.g., triangular, sawtooth, etc.). In the case of LSPWM method, the carrier signals 1008 are shifted apart from each other to define a linear modulation range for the command signal 106'.

In the exemplary system of FIG. 10, voltages ($V_{fc212}$, $V_{fc214}$, $V_{fc261}$, and $V_{fc263}$) of flying capacitors 261/263 can be directly obtained in real-time using one or more voltage sensors (not shown) in association with the flying capacitors. These real-time voltages are provided to the controller 140' via voltage information signals 1010 and 1012. In other embodiments, the flying capacitor voltages ($V_{fc212}$, $V_{fc214}$, $V_{fc261}$, and $V_{fc263}$) can be indirectly obtained through calculation or prediction. The pulse generator 1000 provides first and second level control signals control signals 1014 and 1016, respectively, to control operation of the nested cells 200 and 201 to synthesize the desired output voltage, while achieving additional control objectives, such as regulation of voltages cross flying capacitors ($V_{fc212}$, $V_{fc214}$, $V_{fc261}$, and $V_{fc263}$), and/or balance thermal stress of power switches.

In the nested structure 219 of FIG. 10, when a number of output voltage levels, such as the voltage levels 501 of FIG. 5C are desired, the redundant switching states technique discussed above can be applied. For example, due to the switching states redundancy for operating the power switches within the inner cell 200 and the outer cell 201, a plurality of current paths can be formed. These current paths allow the current to pass through selected circuit switches such that the flying capacitor 261/263 can be charged and/or discharged to maintain their voltages at pre-determined levels. This operation can occur within the operational principles of the Bilevel and L-level switching devices discussed above, for example, with respect to FIGS. 5A and 5B.

Figure 11:
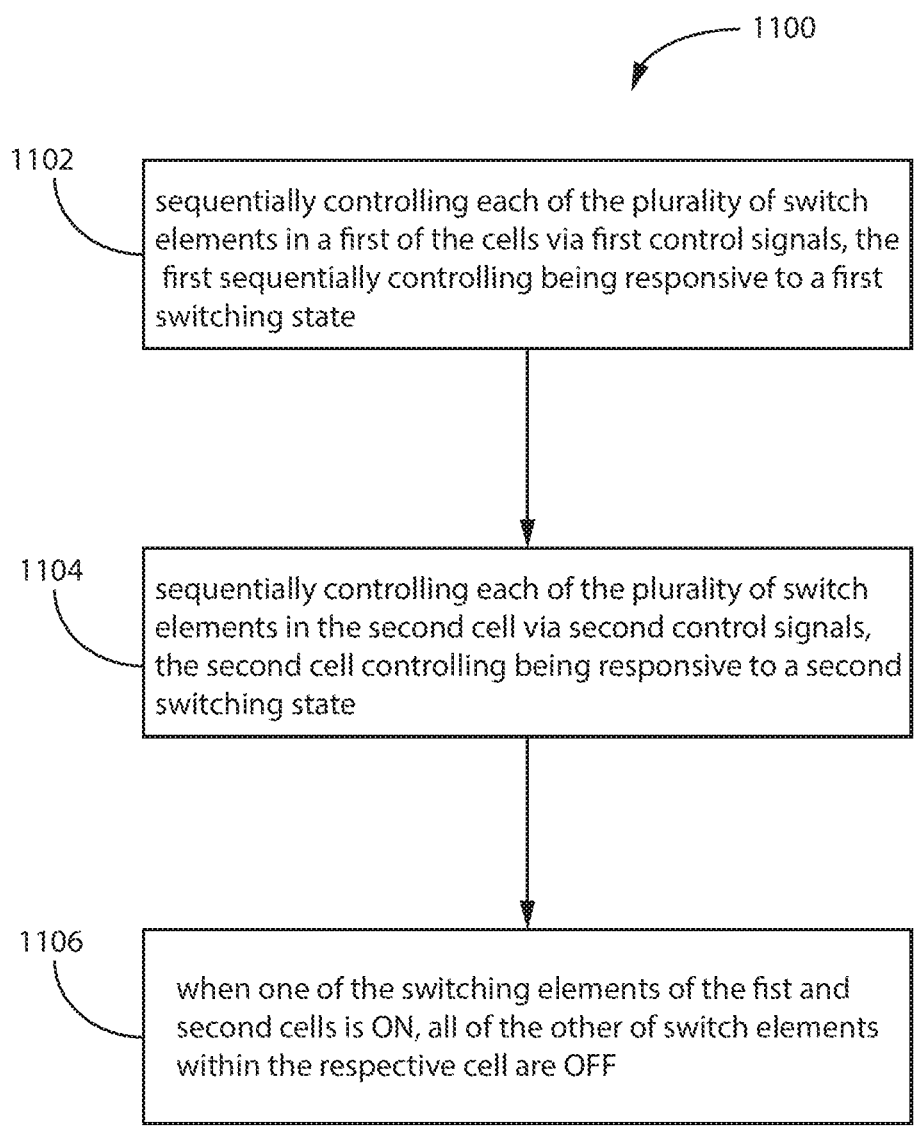
FIG. 11 is a flow chart of an exemplary method of practicing an embodiment of the present invention.

FIG. 11 is a flow chart of an exemplary method 1100 of practicing an embodiment of the present invention. In FIG. 11, the method 1100 is provided for controlling an output of a power conversion system including two or more cells. Each of the two or more cells contains a plurality of switch elements, wherein at least one of the cells is a 3-level NPP cell.

For ease of description, one or more steps or operations included in method 1100 are grouped in blocks. Nevertheless, one of ordinary skill in the art will readily understand that operations described in each block may be performed independently, sequentially, or asynchronously, without departing from the spirit and scope of the present invention.

Method 1100 includes a first block 1102 that comprises sequentially controlling each of the plurality of switch elements in a first of the cells via first control signals, the step of sequentially controlling being responsive to a first switching state. Method 1100 further includes a second block 1104 comprising sequentially controlling each of the plurality of switch elements in the second cell via second control signals, the second cell controlling being responsive to a second switching state. The method 1100 further includes a block 1106, when one of the switch elements of the first or second cells is ON, all of the other of the switch elements within the respective cell are OFF.

Figure 12:
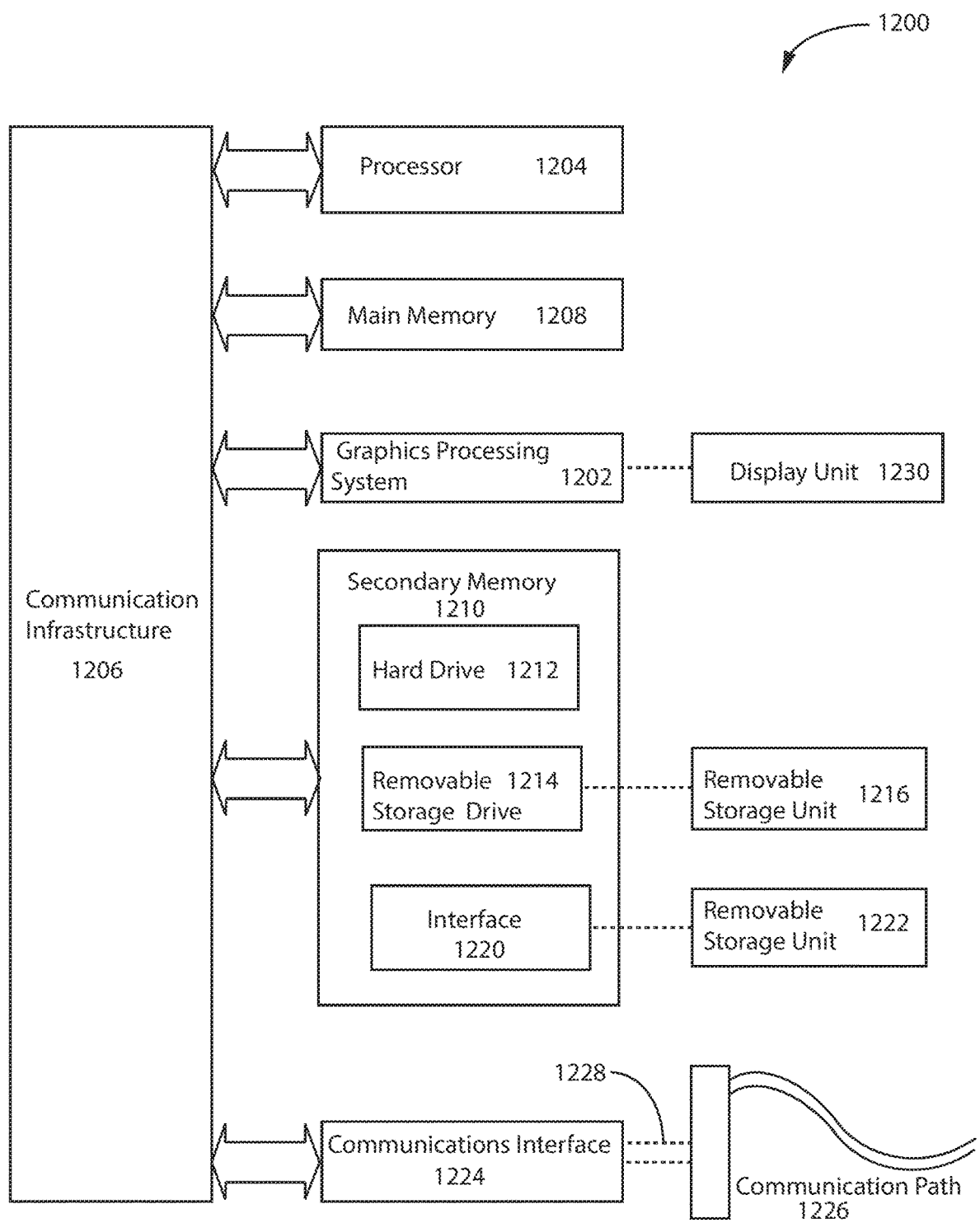
FIG. 12 is a block diagram illustration of an exemplary computer system in which aspects of embodiments of the present invention may be implemented.

FIG. 12 is a block diagram illustration of an exemplary computer system 1200 upon which aspects of the present invention can be implemented. The computer system 1200 includes one or more processors, such as processor 1204. Processor 1204 may be a general purpose processor, such as a central processing unit (CPU) or a special purpose processor, such as a graphics processor unit (GPU). The processor 1204 is connected to a communication infrastructure 1206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1200 can include a graphics processing system 1202 which performs physics simulation and graphics processing tasks for rendering images to an associated display 1230. The computer system 1200 also includes a main memory 1208, preferably random access memory (RAM), and may also include a secondary memory 1210.

The secondary memory 1210 may include, for example, a hard disk drive 1212 and/or a removable storage drive 1214, representing a floppy disk drive, a magnetic tape drive, an optical disk drive, etc. The removable storage drive 1214 reads from and/or writes to a removable storage unit 1216. Removable storage unit 1216 represents a universal serial bus (USB) drive, flash drive, magnetic tape, optical disk, etc. which is read by and written to by removable storage drive 1214. As will be appreciated, the removable storage unit 1216 includes a computer usable storage medium having stored therein computer software and/or data.

In alternative embodiments, secondary memory 1210 may include other similar devices for allowing computer programs or other instructions to be loaded into computer system 1200. Such devices may include, for example, a removable storage unit 1222 and an interface 1220. Examples of such may include a program cartridge and cartridge interface, a removable memory chip (such as an erasable programmable read only memory (EPROM), or programmable read only memory (PROM)) and associated socket, and other removable storage units 1222 and interfaces 1220, which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a personal computer memory card International Association (PCMCIA) slot and card, etc.

Software and data transferred via communications interface 1224 are in the form of signals 1228 which may be electronic, electromagnetic, optical, or other signals capable of being received by communications interface 1224. These signals 1228 are provided to communications interface 1224 via a communications path (e.g., channel) 1226. This channel 1226 carries signals 1228 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1214, a hard disk installed in hard disk drive 1212, and signals 1228. These computer program products provide software to computer system 1200.

Computer programs (also referred to as computer control logic) are stored in main memory 1208 and/or secondary memory 1210. Computer programs may also be received via communications interface 1224. Such computer programs, when executed, enable the computer system 1200 to perform features of the present invention, as discussed herein. Accordingly, such computer programs represent controllers of the computer system 1200.

In an embodiment where the invention is implemented using software, the software may be stored in a computer program product and loaded into computer system 1200 using removable storage drive 1214, hard drive 1212 or communications interface 1224. The control logic (software), when executed by the processor 1204, causes the processor 1204 to perform the functions of the invention as described herein.

CONCLUSION

Alternative embodiments, examples, and modifications which would still be encompassed by the teachings presented herein may be made by those skilled in the art, particularly in light of the foregoing detailed description. Further, it should be understood that the terminology used herein is intended to be in the nature of words of description rather than of limitation.

Those skilled in the art will also appreciate that various adaptations and modifications of the preferred and alternative embodiments described above can be configured without departing from the scope and spirit of the invention. Therefore, it is to be understood that, within the scope of the appended claims, the invention may be practiced other than as specifically described herein.

What is claimed is:

1. An apparatus, comprising:
   a capacitor module having a plurality of connecting terminals;
   a plurality of switch elements, each having at least one switch terminal coupled to a corresponding one of the connecting terminals; and
   a control device to control the plurality of switch elements, wherein the switch elements are configured for mutually exclusive operation via the control device,
   a first cell structure and a second cell structure cooperatively producing a multi-level output voltage having at least five levels, wherein the first cell structure and the second cell structure each include three switch elements of the plurality of switch elements, wherein only one switch element of the switch elements of the first cell structure is activated at a time while the other of the switch elements of the first cell structure are deactivated, and wherein only one switch element of the switch elements of the second cell structure is activated at a time while the other of the switch elements of the second cell structure are deactivated, and wherein the first cell structure is an inner cell having at least three voltage levels and the second cell structure is an outer cell having at least three voltage levels, wherein the first cell structure and the second cell structure comprise components with an S-level designation for the first cell structure and with a T-level designation for the second cell structure, wherein the control device coordinates control signals to the first cell structure and the second cell structure to transition from one switching state to another switching state, within the respective S and T levels, and wherein the control device uses redundant switching states to charge and discharge the capacitor module to produce a selectable output voltage pattern and balance thermal stress of the plurality of switch elements in different switch positions.

2. The apparatus of claim 1, wherein the capacitor module forms flying capacitors.

3. The apparatus of claim 1, wherein the capacitor module forms DC link capacitors.

4. The apparatus of claim 1, wherein operation of the plurality of switch elements is substantially non-overlapping.

5. The apparatus of claim 1, wherein the components within the second cell structure are substantially identical to components within the first cell structure.

6. The apparatus of claim 5, wherein the first and second cells form a nested structure.

7. The apparatus of claim 1, wherein at least one of the plurality of switch elements is formed of two or more power switches that are couples together in series.

8. The apparatus of claim 7, wherein the series connected power switches are configured to provide fault tolerant operation.

9. The apparatus of claim 1, wherein at least one of the plurality of switch elements is a bi-directional switch.

10. The apparatus of claim 1, wherein at least one of the plurality of switch elements is configured for conducting bi-directional current.

11. The apparatus of claim 1, wherein at least one of the plurality of switch elements (i) is formed of one or more power switches; and (ii) is configured to become active only when all of the one or more power switches are active.

12. The apparatus of claim 11, wherein the plurality of switch elements are configured such that (i) before a first switch element of the plurality of switch elements becomes inactive, one of the one or more power switches of the at least one switch element formed of one or more power switches becomes active; and (ii) after the first switch element becomes inactive, another one of the one or more power switches of the at least one switch element formed of one or more power switches becomes active.

13. The apparatus of claim 12, wherein the at least one switch element formed of one or more power switches becomes active when all of the power switches of the at least one switch element are active.

14. The apparatus of claim 1, wherein the first cell structure is different from the second cell structure.

15. The apparatus of claim 1, wherein the control device is configured for sequentially controlling the plurality of switch elements via control signals, and wherein the control device is configured to control voltage across the capacitor module.

16. The apparatus of claim 1, wherein the plurality of connecting terminals includes at least three connecting terminals.

17. The apparatus of claim 16, wherein the plurality of switch elements includes at least three switch elements.

* * * * *